US008369645B2

(12) United States Patent
Harada

(10) Patent No.: US 8,369,645 B2
(45) Date of Patent: Feb. 5, 2013

(54) IMAGE CORRECTION CIRCUIT, IMAGE CORRECTION METHOD AND IMAGE DISPLAY

(75) Inventor: Shigeru Harada, Tokyo (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 11/743,339

(22) Filed: May 2, 2007

(65) Prior Publication Data

US 2007/0286532 A1    Dec. 13, 2007

(30) Foreign Application Priority Data

May 17, 2006  (JP) .................................. 2006-138165

(51) Int. Cl.
  G06K 9/40   (2006.01)
  G06K 9/00   (2006.01)
  G06T 5/40   (2006.01)
(52) U.S. Cl. ........ 382/274; 382/168; 382/169; 358/521; 358/522; 358/523; 348/254; 348/671; 348/672
(58) Field of Classification Search .................. 382/274, 382/168, 169; 358/521, 522, 523; 348/254, 348/671, 672
See application file for complete search history.

(56) References Cited

U.S. PATENT DOCUMENTS

| 4,999,711 | A | | 3/1991 | Paulin | |
|---|---|---|---|---|---|
| 5,748,802 | A | * | 5/1998 | Winkelman | 382/271 |
| 5,808,697 | A | * | 9/1998 | Fujimura et al. | 348/672 |
| 6,664,973 | B1 | * | 12/2003 | Iwamoto et al. | 345/589 |
| 7,006,668 | B2 | * | 2/2006 | Iguchi et al. | 382/108 |
| 7,127,123 | B2 | * | 10/2006 | Wredenhagen et al. | 382/274 |
| 7,271,939 | B2 | * | 9/2007 | Kono | 358/519 |
| 7,283,683 | B1 | * | 10/2007 | Nakamura et al. | 382/274 |
| 7,359,572 | B2 | * | 4/2008 | Liu et al. | 382/274 |
| 7,421,120 | B2 | * | 9/2008 | Kang | 382/167 |
| 7,424,148 | B2 | * | 9/2008 | Goh | 382/169 |
| 7,426,300 | B2 | * | 9/2008 | Ohkawa | 382/169 |
| 7,551,794 | B2 | * | 6/2009 | Masuno et al. | 382/264 |
| 7,570,836 | B2 | * | 8/2009 | Imai | 382/274 |

(Continued)

FOREIGN PATENT DOCUMENTS

JP          2-12246         1/1990
JP      2000-287104        10/2000

(Continued)

OTHER PUBLICATIONS

U.S. Appl. No. 11/743,366, filed May 2, 2007, Harada.

(Continued)

*Primary Examiner* — Michael A Newman
(74) *Attorney, Agent, or Firm* — Oblon, Spivak, McClelland, Maier & Neustadt, L.L.P.

(57) ABSTRACT

An image correction circuit includes: a region determining means for determining an intermediate luminance region in each image frame on the basis of the description of input image data; a luminance distribution acquiring means for acquiring a luminance distribution of input image data in the determined intermediate luminance region in each image frame; a determining means for determining an input/output characteristic line in each image frame by adaptively changing a predetermined reference input/output characteristic line on the basis of the acquired luminance distribution of the intermediate luminance region, the input/output characteristic line defining the substance of image correction on input image data; and a correction executing means for executing image correction on input image data on the basis of the determined input/output characteristic line.

17 Claims, 16 Drawing Sheets

U.S. PATENT DOCUMENTS

| | | | |
|---|---|---|---|
| 2003/0002736 A1* | 1/2003 | Maruoka et al. | 382/168 |
| 2003/0174890 A1 | 9/2003 | Yamauchi | |
| 2004/0066979 A1* | 4/2004 | Gindele et al. | 382/274 |
| 2005/0104842 A1 | 5/2005 | Baik | |
| 2005/0212726 A1* | 9/2005 | Namba et al. | 345/63 |
| 2005/0213814 A1* | 9/2005 | Lin | 382/169 |
| 2006/0061842 A1* | 3/2006 | Oka et al. | 358/522 |
| 2007/0092136 A1* | 4/2007 | Zhao et al. | 382/169 |
| 2007/0286533 A1* | 12/2007 | Harada | 382/309 |

FOREIGN PATENT DOCUMENTS

| | | |
|---|---|---|
| JP | 2000-307896 | 11/2000 |
| JP | 2003-308529 | 10/2003 |
| JP | 2005-202749 | 7/2005 |
| JP | 2006-18465 | 1/2006 |
| JP | 2006-98614 | 4/2006 |
| WO | WO 9938319 A1 * | 7/1999 |

OTHER PUBLICATIONS

Search Report issued Jan. 17, 2011, in European Application No. 07 10 7941.

Japanese Office Action issued Sep. 1, 2011, in Patent Application No. 2007-131587.

* cited by examiner

IMAGE CORRECTION CIRCUIT, IMAGE CORRECTION METHOD AND IMAGE DISPLAY

CROSS REFERENCES TO RELATED APPLICATIONS

The present invention contains subject matter related to Japanese Patent Application JP 2006-138165 filed in the Japanese Patent Office on May 17, 2006, the entire contents of which being incorporated herein by reference.

BACKGROUND OF THE INVENTION

1. Field of the Invention

The present invention relates to an image correction circuit having a function of performing a correction process on an image signal, an image correction method and an image display.

2. Description of the Related Art

Apparatuses such as television receivers, VTRs (Video Tape Recorders), digital cameras, television cameras or printers typically have an image processing function which makes image quality correction to an input image, and then outputs the input image (for example, functions such as luminance or contrast control, and contour correction). Such a function is effectively applied mainly to a totally dark and low-contrast image or a blurred image.

Among these functions, in general, the contrast control is performed by correcting a gamma curve which represents so-called gamma characteristics, and as an example, there is a method of using a luminance distribution as the histogram distribution of an input image. More specifically, for example, as shown in FIG. 13A, in the case where a luminance distribution (a luminance distribution 106A) is distributed in a low luminance region (a black level region), for example, as shown in FIG. 13B, a gamma curve is corrected from L101 to L102. Likewise, for example, as shown in FIG. 14A, in the case where a luminance distribution (a luminance distribution 106B) is distributed in a high luminance region (a white level region), for example, as shown in FIG. 14B, a gamma curve is corrected from L101 to L103, and, for example, as shown in FIG. 15A, in the case where a luminance distribution (a luminance distribution 106C) is distributed in an intermediate luminance region, for example, as shown in FIG. 15B, a gamma curve is corrected from L101 to L104. In addition, the amount of correction which is set at each luminance level at the time of correcting the gamma curve is called gain.

Moreover, for example, in Japanese Unexamined Patent Application Publication Nos. 2006-93753 and 2005-175933, there are disclosed contrast improvement methods in which the luminance distribution of an input image is detected as a histogram distribution, and a gamma curve is corrected at each distribution peak on the basis of the luminance histogram distribution.

SUMMARY OF THE INVENTION

In contrast improvement methods using a luminance histogram distribution in related arts, as shown in FIGS. 11A and 11B through 13A and 13B, distribution results detected in all luminance regions are reflected to contrast improvement in all luminance regions, or as shown in Japanese Unexamined Patent Application Publication Nos. 2006-93753 and 2005-175933, a distribution result detected in a part of a luminance region is reflected to contrast improvement in the part, and a luminance region where a luminance histogram distribution is detected is a predetermined fixed region. However, in the case of such contrast improvement methods, for example, as will be described below, depending on the descriptions of an input image, the contrast may not be improved effectively, or a displayed image may appear unnatural.

In other words, for example, it is considered that in the case where only one distribution peak or a small number of distribution peaks exist in a luminance histogram distribution in an image frame, when a gamma curve is corrected at each distribution peak detected in a fixed luminance region, effective contrast improvement can be achieved. However, in the case where a large number of distribution peaks exist in a luminance histogram distribution, when a gamma curve is corrected at each of such a large number of distribution peaks on the basis of a distribution result in a fixed luminance region, for example, the gamma curve are complicated like gamma curves L105A and L105B shown in FIGS. 16A and 16B. Therefore, for example, as shown in FIG. 16A, the effect of improving contrast is reduced, and when the slope of a curve is increased to enhance the effect, for example, the curve has a negative slope like the gamma curve L105B as shown in FIG. 16B, thereby a displayed image appears unnatural.

Thus, in techniques in related arts in which the distribution result detected in the predetermined fixed luminance region is reflected to contrast improvement, it is difficult to effectively improve contrast irrespective of the descriptions of an input image.

In view of the foregoing, it is desirable to provide an image correction circuit capable of achieving effective contrast improvement irrespective of the descriptions of an input image, an image correction method and an image display.

According to an embodiment of the invention, there is provided an image correction circuit including: a region determining means for determining an intermediate luminance region in each image frame on the basis of the descriptions of input image data; a luminance distribution acquiring means for acquiring a luminance distribution of input image data in the determined intermediate luminance region in each image frame; a determining means for determining an input/output characteristic line in each image frame by adaptively changing a predetermined reference input/output characteristic line on the basis of the acquired luminance distribution of the intermediate luminance region, the input/output characteristic line defining the substance of image correction on input image data; and a correction executing means for executing image correction on input image data on the basis of the determined input/output characteristic line. In this case, "a reference input/output characteristic line" is not limited to the characteristic of a line shape, and may be a characteristic line shown by a curve.

According to an embodiment of the invention, there is provided an image correction method including the steps of: determining an intermediate luminance region in each image frame on the basis of the descriptions of input image data; acquiring a luminance distribution of input image data in the determined intermediate luminance region in each image frame; determining an input/output characteristic line in each image frame by adaptively changing a predetermined reference input/output characteristic line on the basis of the acquired luminance distribution of the intermediate luminance region, the input/output characteristic line defining the substance of image correction on input image data; and executing image correction on input image data on the basis of the determined input/output characteristic line.

According to an embodiment of the invention, there is provided an image display including: a region determining means for determining an intermediate luminance region in each image frame on the basis of the descriptions of input image data; a luminance distribution acquiring means for acquiring a luminance distribution of input image data in the determined intermediate luminance region in each image frame; a determining means for determining an input/output characteristic line in each image frame by adaptively changing a predetermined reference input/output characteristic line on the basis of the acquired luminance distribution of the intermediate luminance region, the input/output characteristic line defining the substance of image correction on input image data; a correction executing means for executing image correction on input image data on the basis of the determined input/output characteristic line, and a display means for displaying an image on the basis of input image data on which image correction is performed.

In the image correction circuit, the image correction method and the image display according to the embodiment of the invention, the intermediate luminance region is determined in each image frame on the basis of the descriptions of input image data, and a luminance distribution of input image data in the intermediate luminance region is acquired in each image frame. Moreover, the reference input/output characteristic line is adaptively changed on the basis of the acquired luminance distribution of the intermediate luminance region, thereby the input/output characteristic line is determined in each image frame. Then, on the basis of the determined input/output characteristic line, image correction on input image data is executed. Therefore, the input/output characteristic line is determined on the basis of the luminance distribution in the intermediate luminance region in each image frame on the basis of the descriptions of input image data, so the input/output characteristic line easily forms a simple curve irrespective of the descriptions of input image data.

In the image correction circuit according to the embodiment of the invention, the above-described region determining means can have a configuration so as to determine a weighed luminance center of a luminance distribution of input image data in each image frame, and to determine, as the above-described intermediate luminance region, an area determined by setting a first width from the acquired weighed luminance center to a low luminance side and by setting a second width from the weighed luminance center to a high luminance side. In this case, "a weighed luminance center" means a luminance position corresponding to a value equal to the sum of the product of luminance and frequency (total integral) divided by the sum of frequency in a luminance distribution of one image frame.

The image correction circuit according to the embodiment of the invention can have such a configuration that the above-described luminance distribution acquiring means acquires a black-side intermediate luminance distribution in each image frame as a luminance distribution in a region between a lowest luminance in the determined intermediate luminance region and a reference luminance provided in the center of the intermediate luminance region, and the above-described determining means determines a low-luminance-region input/output characteristic curve on the basis of the acquired black-side intermediate luminance distribution, the low-luminance-region input/output characteristic curve passing through a reference point, in the reference input/output characteristic line, determined in accordance with the reference luminance and through a minimum luminance point of the reference input/output characteristic line, and the above-described correction executing means executes image correction on input image data having a luminance lower than the reference luminance on the basis of the determined low-luminance-region input/output characteristic curve. In such a configuration, the low-luminance-region input/output characteristic curve as a part of the above-described input/output characteristic line easily forms a simple curve irrespective of the descriptions of input image data.

In this case, it is preferable that the above-described luminance distribution acquiring means further acquires a white-side luminance distribution as a luminance distribution in a region between a highest luminance in the determined intermediate luminance region and the refrence luminance, the above-described determining means further determines a high-luminance-region input/output characteristic curve passing through the reference point, in the reference input/output characteristic line, and through a maximum luminance point of the reference input/output characteristic line on the basis of the acquired white-side intermediate luminance distribution, and the above-described correction executing means executes image correction on input image data in regions of lower luminance and higher luminance relative to the reference luminance on the basis of the determined low-luminance-region input/output characteristic curve and the determined high-luminance-region input/output characteristic curve, respectively. In such a configuration, the high-luminance-region input/output characteristic curve as a part of the above-described input/output characteristic line easily forms a simple curve irrespective of the descriptions of input image data. Moreover, the above-described low-luminance-region input/output characteristic curve is more preferably a curve provided below the reference input/output characteristic line and not having an inflection point, and the above-described high-luminance-region input/output characteristic curve is more preferably a curve provided above the reference input/output characteristic line and not having an inflection point. In this case, "an inflection point" means a point at which the sign of the second derivative of a function defining the curve changes from positive to negative or from negative to positive. In such a configuration, the low-luminance-region input/output characteristic curve and the high-luminance-region input/output characteristic curve form the simplest curves, and the effect of improving the contrast is further enhanced.

In the image correction circuit, the image correction method and the image display according to the embodiment of the invention, the intermediate luminance region is determined in each image frame on the basis of the descriptions of input image data, and the luminance distribution of input image data in the intermediate luminance region is acquired in each image frame, and on the basis of the acquired luminance distribution of the intermediate luminance region, the input/output characteristic line is determined in each image frame, and on the basis of the determined input/output characteristic line, image correction on input image data is executed, so irrespective of the descriptions of input image data, the input/output characteristic line can easily form a simple curve. Therefore, for example, even in the case where a luminance histogram distribution in an image frame includes a large number of distribution peaks, an unnatural image is not displayed, and effective contrast improvement can be achieved.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
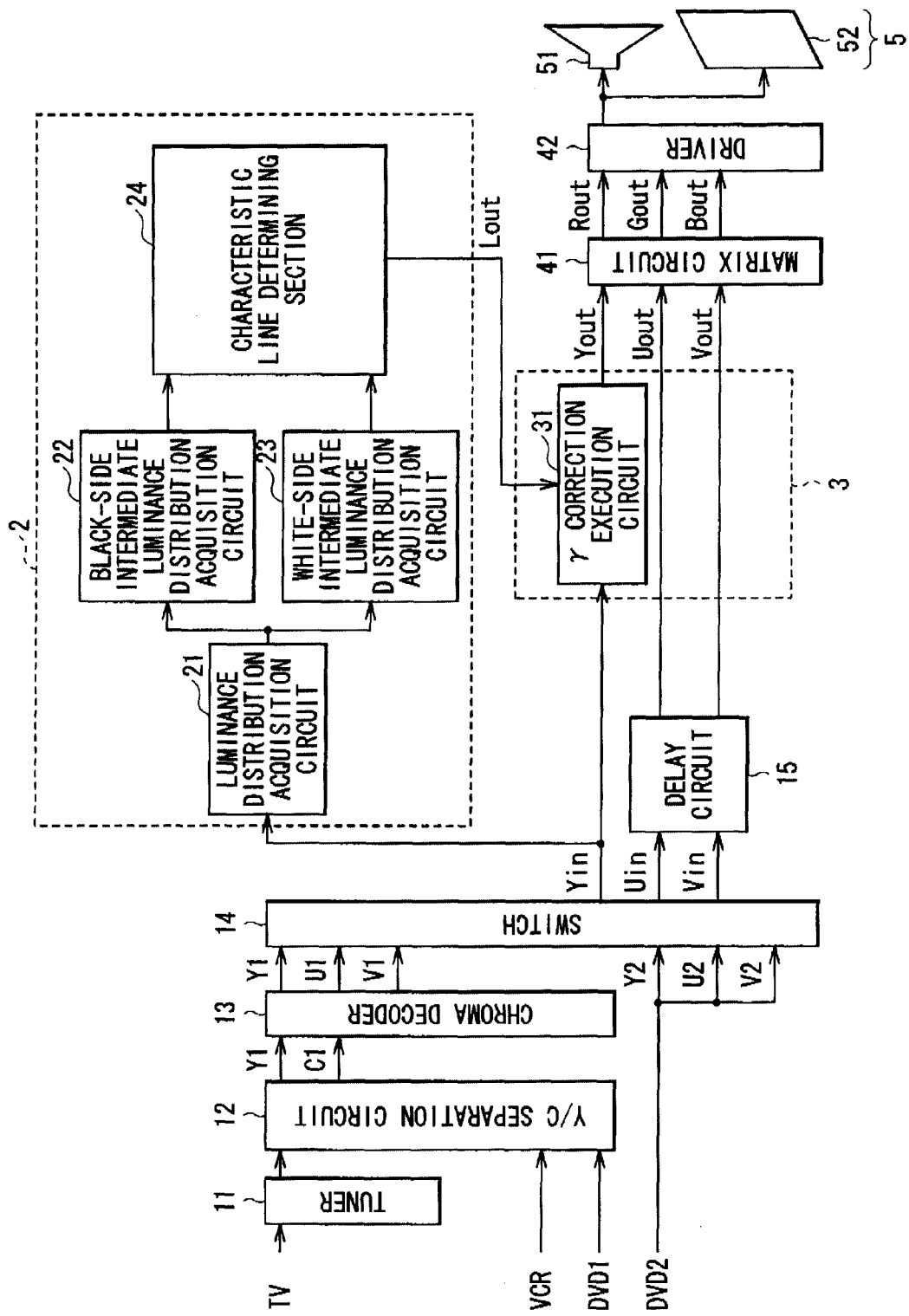
FIG. 1 is a circuit block diagram showing the whole configuration of an image display according to a first embodiment of the invention.

FIG. 1 shows the whole configuration of an image display according to a first embodiment of the invention. The image display includes an image processing function section including a tuner 11, a Y/C separation circuit 12, a chroma decoder 13, a switch 14, a delay circuit 15, an input/output characteristic line generating section 2 and an image processing section 3, and an image display function section including a matrix circuit 41, a driver 42 and a display 5. An image correction circuit and an image correction method according to a first embodiment of the invention are embodied by the image display according to the embodiment, so they will be also described below.

Image signals inputted into the image display may be outputs from a VCR (Video Cassette Recorder), a DVD (Digital Versatile Disc) or the like in addition to a TV signal from a TV (television). It has become common practice for recent televisions and personal computers (PCs) to obtain image information from a plurality of kinds of media and display an image corresponding to each of the media.

The tuner 11 receives and demodulates the TV signal from the TV, and outputs the TV signal as a composite video burst signal (CVBS).

The Y/C separation circuit 12 separates the composite video burst signal from the tuner 11 or a composite video burst signal from a VCR or a DVD1 into a luminance signal Y1 and a chrominance signal C1 to output them.

The chroma decoder 13 outputs the luminance signal Y1 and the chrominance signal C1 separated by the Y/C separation circuit 12 as YUV signals (Y1, U1, V1) including the luminance signal Y1 and color-difference signals U1 and V1.

The YUV signals are image data of a digital image, and a set of pixel values corresponding to a position on a two-dimensional image. A luminance signal Y represents a luminance level, and takes an amplitude value between a white level which is 100% white and a black level. Moreover, a 100% white image signal is 100 (IRE) in a unit called IRE (Institute of Radio Engineers) representing a relative ratio of an image signal. The black level is 0 IRE. On the other hand, the color-difference signals U and V correspond to a signal B-Y produced by subtracting the luminance signal Y from blue (B), and a signal R-Y produced by subtracting the luminance signal Y from red (R), respectively, and when the signals U and V are combined with the luminance signal Y, colors (color phases, chroma saturation, luminance) can be shown.

The switch 14 switches YUV signals from a plurality of kinds of media (in this case, the YUV signals (Y1, U1, V1) and YUV signals (Y2, U2, V2) from a DVD2) so as to output selected signals as YUV signals (Yin, Uin, Vin).

The input/output characteristic line generating section 2 adaptively generates an input/output characteristic line (a γ curve) used in the γ correction execution circuit 31 of the image processing section 3 which will be described later, and includes a luminance distribution acquisition circuit 21, a black-side intermediate luminance distribution acquisition circuit 22, a white-side intermediate luminance distribution acquisition circuit 23 and a characteristic line determining section 24.

The luminance distribution acquisition circuit 21 acquires a luminance distribution as a histogram distribution on the basis of the luminance signal Yin of the YUV signals (Yin, Uin, Vin) outputted from the switch 14, and determines a weighed luminance center of the acquired luminance distribution to determine an intermediate luminance region centered on the weighed luminance center. The weighed luminance center is a luminance position corresponding to a value equal to the sum of the product of luminance and frequency (total integral) divided by the sum of frequency in a luminance distribution of one image frame.

Figure 2:
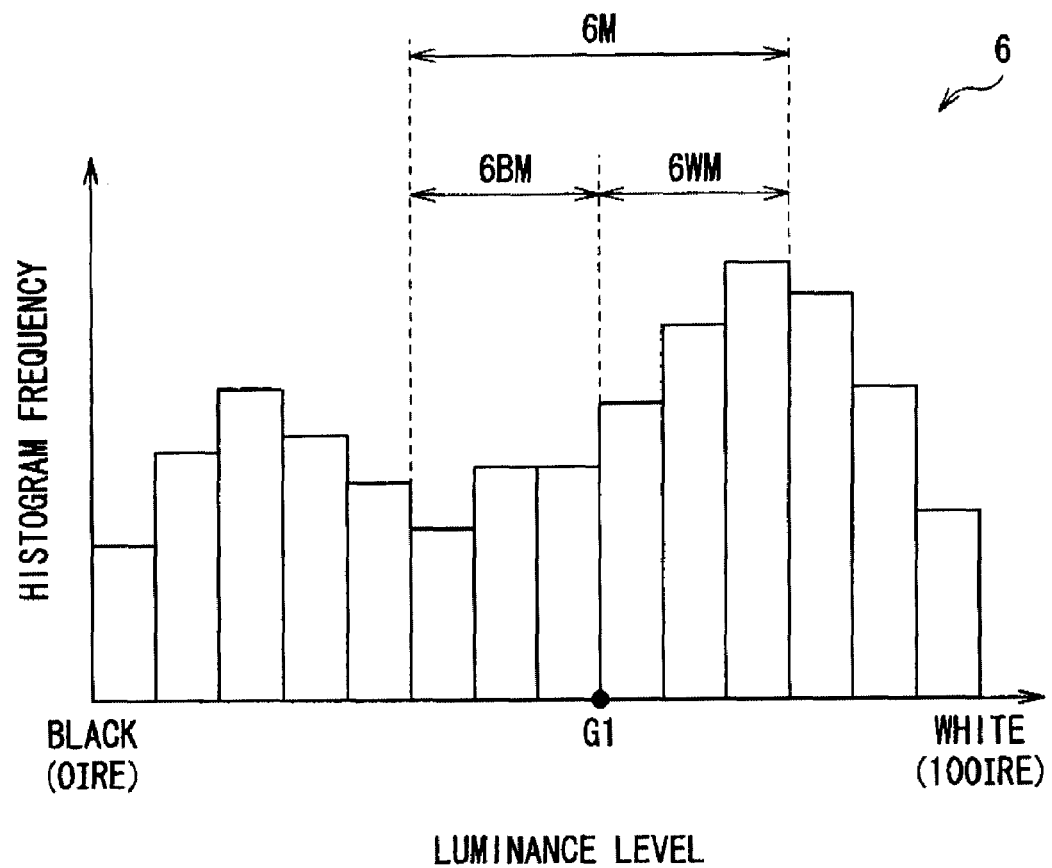
FIG. 2 is a plot for describing a relationship between a luminance distribution, a weighed luminance center and an intermediate luminance region.

FIG. 2 shows an example of a luminance distribution (a luminance distribution 6) acquired by the luminance distribution acquisition circuit 21, and the vertical axis indicates frequency of the histogram distribution, and the horizontal axis indicates luminance level.

The luminance distribution acquisition circuit 21 acquires such a luminance distribution 6 per data for 1 frame when displaying an image or per data of an image frame (image data constituting one screen) which is data for 1 field. Moreover, on the basis of such a luminance distribution 6, the weighed luminance center (for example, a weighed luminance center G1 in FIG. 2) of a luminance distribution is determined in each image frame, and an area having a predetermined width (in an example shown in FIG. 2, a width equal to 3 gray levels) from the acquired weighed luminance center G1 to each of a low luminance side and a high luminance side is determined as an intermediate luminance region in each image frame. In this case, the weighed luminance center G is determined by, for example, the following formula 1, and a luminance distribution can be acquired in each image frame, so the weighed luminance center G can be determined in each image frame. In addition, data of the luminance distribution 6, the weighed luminance center G and the intermediate luminance region 6M which are acquired in such a manner is outputted to the black-side intermediate luminance distribution acquisition circuit 22 and the white-side intermediate luminance distribution acquisition circuit 23.

[Formula 1]

$$G = \frac{hist1 \times P_1 + hist2 \times P_2 \cdots + histm \times P_m}{hist1 + hist2 + \cdots + histm} \quad (1)$$

$$= \frac{\sum_{k=1}^{m}(hist_k \times P_k)}{\sum_{k=1}^{m} hist_k}$$

Figure 3A:
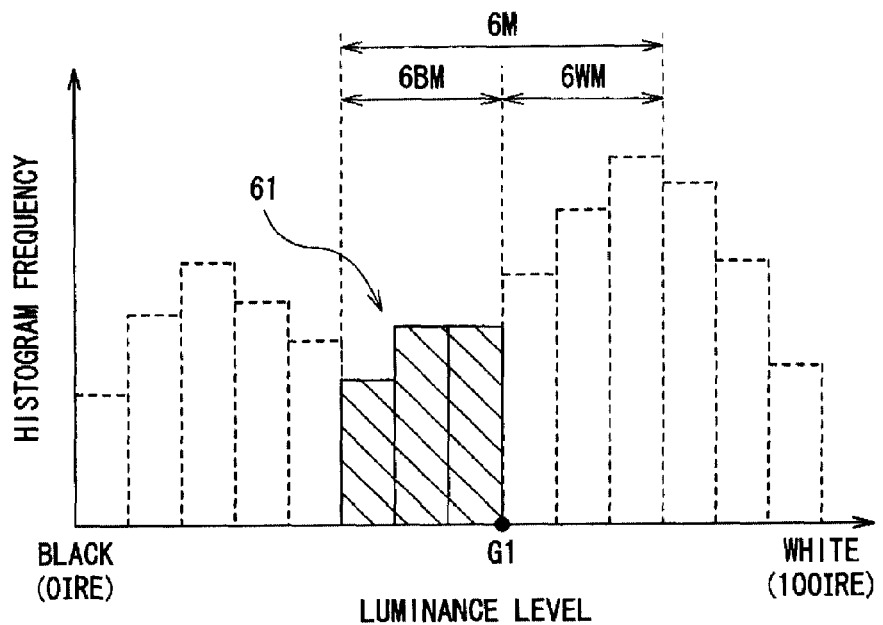
FIGS. 3A and 3B are plots for describing a black-side intermediate luminance distribution and a white-side intermediate luminance distribution.
Figure 3B:
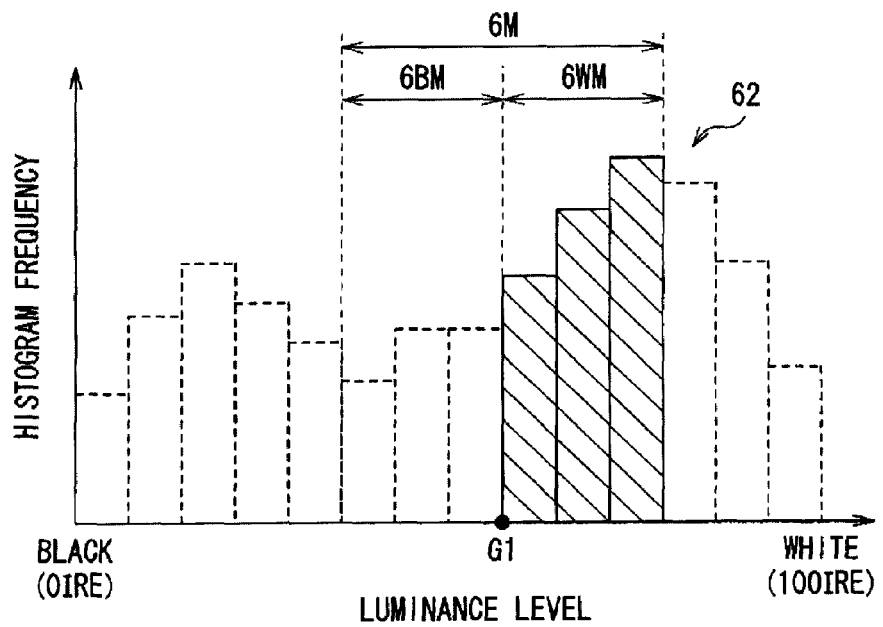

G: weighed luminance center
m: division number of luminance levels in luminance distribution
$hist_k$: frequency of kth luminance level in luminance distribution
$P_k$: kth luminance level in luminance distribution On the basis of the data of the luminance distribution 6, the weighed luminance center G and the intermediate luminance region 6M acquired by the luminance distribution acquisition circuit 21, for example, as shown in FIG. 3A, the black-side intermediate luminance distribution acquisition circuit 22 acquires a black-side intermediate luminance distribution 61 in each image frame as a luminance distribution in a region of lower luminance relative to the weighed luminance center G (a black-side intermediate luminance region 6BM) in the intermediate luminance region 6M determined in each image frame. Likewise, on the basis of the data of the luminance distribution 6, the weighed luminance center G and the intermediate luminance region 6M which are acquired by the luminance distribution acquisition circuit 21, for example, as shown in FIG. 3B, the white-side intermediate luminance distribution acquisition circuit 23 acquires a white-side intermediate luminance distribution 62 in each image frame as a luminance distribution in a region of higher luminance relative to the weighed luminance center G (a white-side intermediate luminance region 6WM) in the intermediate luminance region 6M determined in each image frame.

Figure 4A:
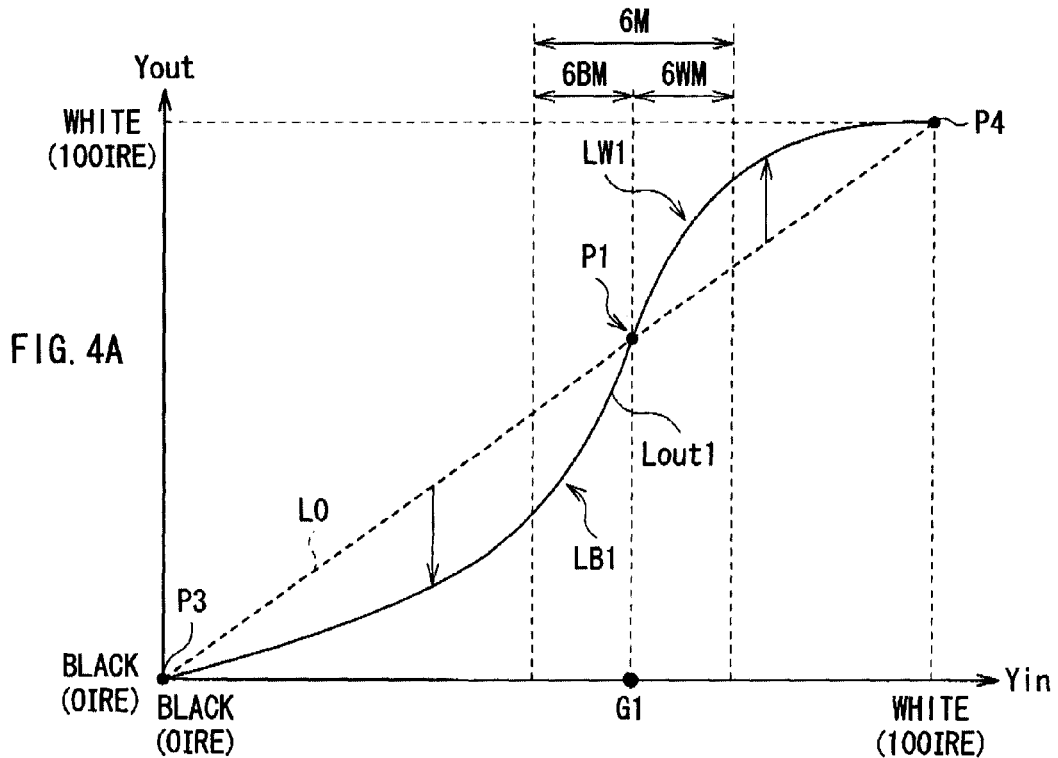
FIGS. 4A and 4B are plots showing specific examples of an input/output characteristic line according to the first embodiment.

Referring back to FIG. 1, for example, as shown in FIG. 4A, on the basis of the black-side intermediate luminance distribution 61 acquired by the black-side intermediate luminance distribution acquisition circuit 22 and the white-side intermediate luminance distribution 62 acquired by the white-side intermediate luminance distribution acquisition circuit 23, the characteristic line determining section 24 determines an input/output characteristic line (a γ curve) Lout1 which is an adaptively changed reference input/output characteristic line L0 representing an input luminance signal Yin=an output luminance signal Yout. More specifically, the γ curve Lout1 includes a low-luminance-region input/output characteristic curve LB1, which passes through a center point P1 determined by the weighed luminance center G1 and the value of the reference input/output characteristic line L0 at the weighed luminance center G1 and a minimum luminance point P3 of the reference input/output characteristic line L0, and a high-luminance-region input/output characteristic curve LW1, which passes through the center point P1 and a maximum luminance point P4 of the reference input/output characteristic line L0. The low-luminance-region input/output characteristic line LB1 and the high-luminance-region input/output characteristic line LW1 are provided below and above the reference input/output characteristic line L0, respectively, and each of them is represented as a curve not having an inflection point (for example, a quadratic curve), thereby the whole γ curve Lout1 is a S-shaped curve.

Figure 4B:
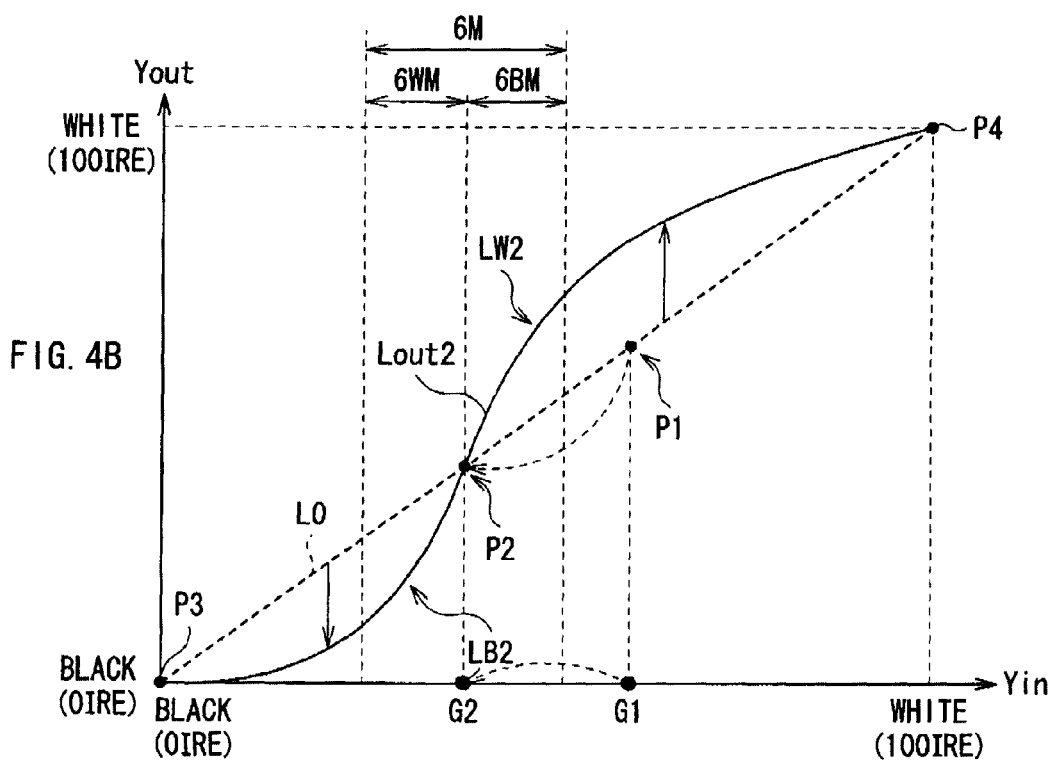

As described above, the weighed luminance center is determined in each image frame, therefore, for example, as shown in FIG. 4B, it is likely that the center point, the low-luminance-region input/output characteristic curve, the high-luminance-region input/output characteristic curve and the γ curve are acquired in each image frame, and are different in each image frame (for example, a weighed luminance center G2, a center point P2, a low-luminance-region input/output characteristic curve LB2, a high-luminance-region input/output characteristic curve LW2 and a γ curve Lout2 in the drawing).

Moreover, the characteristic line determining section 24 determines appropriate gain values in the low-luminance-region input/output characteristic curve LB1 and the high-luminance-region input/output characteristic curve LW1, that is, appropriate amounts of adaptive change from the reference input/output characteristic line L0 on the basis of the total distribution volume in the black-side intermediate luminance distribution 61 and the total distribution volume in the white-side intermediate luminance distribution 62.

Figure 5A:
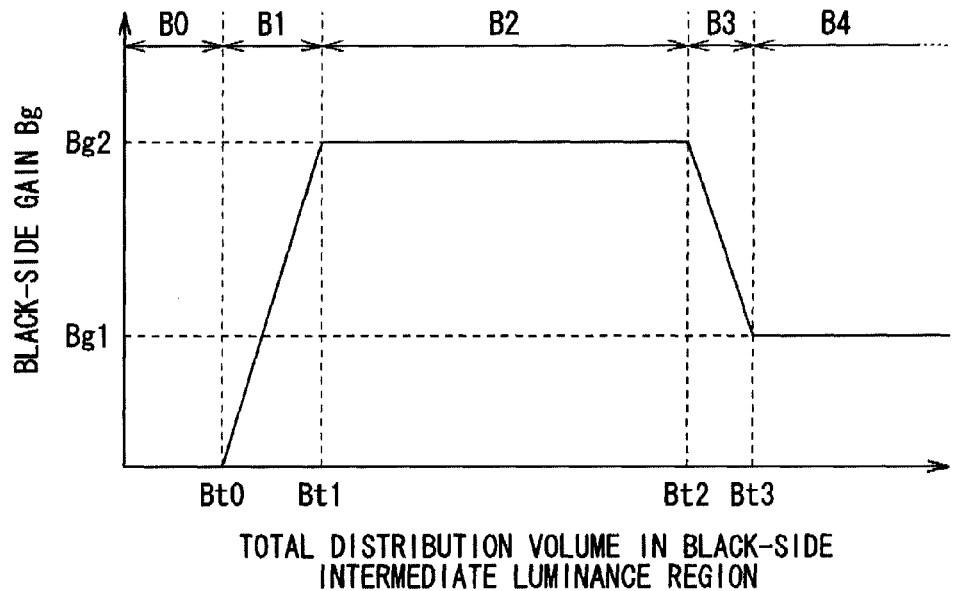
FIGS. 5A and 5B are plots for describing specific examples of a relationship between total distribution volume and gain in an intermediate luminance region.
Figure 5B:
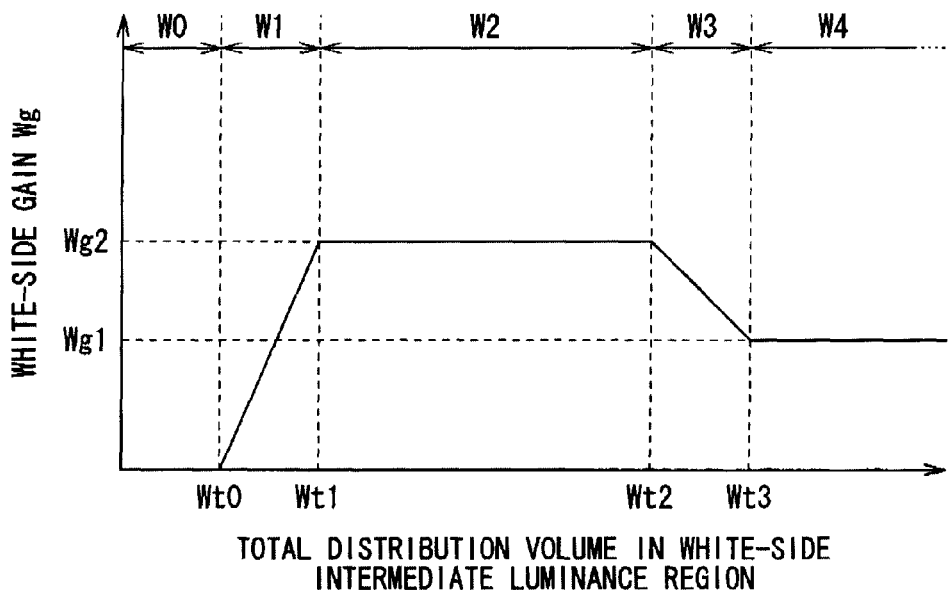

In this case, FIG. 5A shows a relationship between the total distribution volume in the black-side intermediate luminance region 6BM and a gain (a black-side gain Bg) in the low-luminance-region input/output characteristic curve LB1, and FIG. 5B shows a relationship between the total distribution volume in the white-side intermediate luminance region 6WM and a gain (a white-side gain Wg) in the high-luminance-region input/output characteristic curve LW1.

In FIGS. 5A and 5B, there are five regions B0 through B4 and five regions W0 through W4 separated by black-side distribution threshold values Bt0 through Bt3 and white-side distribution threshold values Wt0 through Wt3, respectively, with reference to the value of the total distribution volume in the horizontal axis.

More specifically, in FIG. 5A, in the region B0 in which the total distribution volume is equal to or less than the black-side distribution threshold value Bt0, the value of the black-side gain Bg is "0", and in the region B1 in which the total distribution volume is larger than the black-side distribution threshold value Bt0, and is equal to or less than the black-side distribution threshold value Bt1, the value of the black-side gain Bg is increased (in this case, linearly increased) with an increase in the total distribution volume. Moreover, in the region B2 in which the total distribution volume is larger than the black-side distribution threshold value Bt1, and is equal to or less than the black-side distribution threshold value Bt2, the black-side gain Bg is limited by the black-side gain threshold value Bg2 so as to be a uniform value, and in the regions B3 and B4 in which the total distribution volume is larger than the black-side distribution threshold value Bt2, the black-side gain Bg is limited to less than the black-side gain threshold value Bg2. In other words, in the region B3 in which the total distribution volume is larger than the black-side distribution threshold value Bt2, and is equal to or less than the black-side distribution threshold value Bt3, the value of the black-side gain Bg is decreased (in this case, linearly decreased) with an increase in the total distribution volume, and in the region B4 in which the total distribution volume is larger than the black-side distribution threshold value Bt3, the black-side gain Bg is limited to the black-side gain threshold value Bg1 which is less than the black-side gain threshold value Bg2 to be a uniform value.

Likewise, in FIG. 5B, in the region W0 in which the total distribution volume is equal to or less than the white-side distribution threshold value Wt0, the value of the white-side gain Wg is "0", and in the region W1 in which the total distribution volume is larger than the white-side distribution threshold value Wt0, and is equal to or less than the white-side distribution threshold value Wt1, the value of the white-side gain Wg is increased (in this case, linearly increased) with an increase in the total distribution volume. Moreover, in the region W2 in which the total distribution volume is larger than the white-side distribution threshold value Wt1, and is equal to or less than the white-side distribution threshold value Wt2, the white-side gain Wg is limited by the white-side gain threshold value Wg2 to be a uniform value, and in the regions W3 and W4 in which the total distribution volume is larger than the white-side distribution threshold value Wt2, the white-side gain Wg is limited to less than the white-side gain threshold value Wg2. In other words, in the region W3 in which the total distribution volume is larger than the white-side distribution threshold value Wt2, and is equal to or less than the white-side distribution threshold value Wt3, the value of the white-side gain Wg is decreased (in this case, linearly decreased) with an increase in the total distribution volume, and in the region W4 in which the total distribution volume is larger than the white-side distribution threshold value Wt3, the white-side gain Wg is limited to the white-side gain threshold value Wg1 which is less than the white-side gain threshold value Wg2 to be a uniform value.

Thus, with reference to the total distribution volumes in the black-side intermediate luminance region 6BM and the white-side intermediate luminance region 6WM, the black-side gain Bg and the white-side gain Wg are increased to the black-side distribution threshold value Bt1 and the white-side distribution threshold value Wt1, respectively, according to the total distribution volumes and in the case where the total distribution volumes are larger than the black-side distribution threshold value Bt1 and the white-side distribution threshold value Wt1, the values of the black-side gain Bg and the white-side gain Wg are limited, so a gain in the intermediate luminance region 6M is adjusted so as not to be excessive, as will be described in detail later.

Referring back to FIG. 1, the delay circuit 15 delays the color-difference signals Uin and Vin outputted from the switch 14, and synchronizes the color-difference signals Uin and Vin and the γ curve Lout outputted from the input/output characteristic line generating section 2 to output them to the image processing section 3.

The image processing section 3 performs predetermined image processing on the YUV signals (Yin, Uin, Vin) which are outputted from the switch 14 and pass through the delay circuit 15 through the use of the γ curve Lout which is adaptively generated by the input/output characteristic line generating section 2, and in the image display according to the embodiment, the image processing section 3 includes the γ correction execution circuit 31 performing a contrast improvement process on the YUV signals (Yin, Uin, Vin).

The γ correction execution circuit 31 performs a contrast improvement process on the YUV signals (Yin, Uin, Vin) through the use of the γ curve Lout adaptively generated by the input/output characteristic line generating section 2. More specifically, for example, as shown in FIGS. 4A and 4B, the contrast of the input luminance signal Yin is controlled to a degree shown in a gain in each luminance level by γ curves Lout1 and Lout2 determined in each image frame. The YUV signals (Yout, Uout, Vout) after image processing (controlling the contrast) are outputted to the matrix circuit 41.

The matrix circuit 41 reproduces RGB signals from the YUV signals (Yout, Uout, Vout) after image processing by the image processing section 3, and outputs the reproduced RGB signals (Rout, Gout, Bout) to the driver 42.

The driver 42 produces a driving signal for the display 5 on the basis of the RGB signals (Rout, Gout, Bout) outputted from the matrix circuit 41, and outputs the driving signal to the display 5.

The display 5 displays an image on the basis of the YUV signals (Yout, Uout, Vout) after image processing by the image processing section 3 according to the driving signal outputted from the driver 42. The display 5 may be any kind of display device. For example, a CRT (Cathode-Ray Tube) 51, a LCD (Liquid Crystal Display) 52, a PDP (Plasma Display Panel; not shown) or the like is used.

In this case, the input/output characteristic line generating section 2 and the image processing section 3 correspond to specific examples of "an image correction circuit" in the invention, and the luminance distribution acquisition circuit 21, the black-side intermediate luminance distribution acquisition circuit 22 and the white-side intermediate luminance distribution acquisition circuit 23 correspond to specific examples of "a luminance distribution acquiring means" in the invention. Moreover, the characteristic line determining section 24 corresponds to a specific example of "a determining means" in the invention, and the γ correction execution circuit 31 corresponds to a specific example of "a correction executing means" in the invention.

Next, referring to FIGS. 1 through 5A and 5B, the operation of the image display according to the embodiment will be described below.

At first, an image signal to be inputted into the image display is demodulated into the YUV signals. More specifically, a TV signal from the TV is demodulated into a composite video burst signal by the tuner 11, and a composite video burst signal is directly inputted into the image display from the VCR or the DVD1. Then, the composite video burst signals are separated into the luminance signal Y1 and the chrominance signal C1 in the Y/C separation circuit 12, and then the luminance signal Y1 and the chrominance signal C1 are decoded into the YUV signals (Y1, U1, V1) in the chroma decoder 13. On the other hand, YUV signals (Y2, U2, V2) are directly inputted into the image display from the DVD2.

Next, in the switch 14, either the YUV signals (Y1, U1, V1) or the YUV signals (Y2, U2, V2) are selected to be outputted as the YUV signals (Yin, Uin, Vin). Then, the luminance signal Yin of the YUV signals (Yin, Uin, Vin) is outputted into the input/output characteristic line generating section 2 and the γ correction execution circuit 31 in the image processing section 3, and the color-difference signals Uin and Vin are outputted to the delay circuit 15.

In the input/output characteristic line generating section 2, the following operation of generating the γ curve Lout is performed on the basis of the inputted luminance signal Yin.

More specifically, at first, in the luminance distribution acquisition circuit 21, for example, a luminance distribution as a histogram distribution as shown in FIG. 2 is acquired in each image frame on the basis of the luminance signal Yin of the YUV signals (Yin, Uin, Vin) outputted from the switch 14. Moreover, on the basis of the acquired luminance distribution, the weighed luminance center G1 is determined in each image frame, and a predetermined width from the weighed luminance center G1 to each of a low luminance side and a high luminance side is set so that the intermediate luminance region is determined in each image frame.

Next, in the black-side intermediate luminance distribution acquisition circuit 22 and the white-side intermediate luminance distribution acquisition circuit 23, on the basis of the data of the luminance distribution 6, the weighed luminance center G and the intermediate luminance region 6M acquired by the luminance distribution acquisition circuit 21, the black-side intermediate luminance distribution 61 and the white-side intermediate luminance distribution 62 are acquired in each image frame.

Then, in the characteristic line determining section 24, on the basis of the black-side intermediate luminance distribution 61 acquired by the black-side intermediate luminance distribution acquisition circuit 22 and the white-side intermediate luminance distribution 62 acquired by the white-side intermediate luminance distribution acquisition circuit 23, the reference input/output characteristic line L0 is adaptively changed, and the input/output characteristic line (γ curve) Lout1 including the low-luminance-region input/output characteristic curve LB1 and the high-luminance-region input/output characteristic curve LW1 is determined. Moreover, for example, as shown in FIGS. 5A, and 5B, appropriate values of gains (the black-side gain Bg and the white-side gain Wg) in the low-luminance-region input/output characteristic curve LB1 and the high-luminance-region input/output characteristic curve LW1, that is, appropriate amounts of adaptive change from the reference input/output characteristic line L0 are determined on the basis of the total distribution volume in the black-side intermediate luminance distribution 61 and the total distribution volume in the white-side intermediate luminance distribution 62. More specifically, with reference to the total distribution volumes in the black-side intermediate luminance region 6BM and the white-side intermediate luminance region 6WM, the black-side gain Bg and the white-side gain Wg are increased to the black-side distribution threshold value Bt1 and the white-side distribution threshold value Wt1, respectively, according to the total distribution volumes, and in the case where the total distribution volumes are larger than the black-side distribution threshold value Bt1 and the white-side distribution threshold value Wt1, the values of the black-side gain Bg and the white-side gain Wg are limited so as to prevent a gain in the intermediate luminance region 6M from being excessive. The γ curve Lout adaptively generated in each image frame in such a manner is outputted to the γ correction execution circuit 31 in the image processing section 3.

On the other hand, the delay circuit 15 delays the color-difference signals Uin and Vin, and as a result, the color-difference signals Uin and Vin and the γ curve Lout outputted from the input/output characteristic line generating section 2 are synchronized.

Next, in the γ correction execution circuit 31 of the image processing section 3, on the basis of the luminance signal Yin outputted from the switch 14 and the color-difference signals Uin and Vin outputted from the switch 14 and passing through the delay circuit 15, a contrast improvement process is performed on the YUV signals (Yin, Yin and Vin) through the use of the γ curve Lout supplied from the input/output characteristic line generating section 2. More specifically, the contrast is controlled to degrees shown in the black-side gain Bg in the low-luminance-region input/output characteristic curve LB1 and the white-side gain Wg in the high-luminance-region input/output characteristic curve LW1 in each luminance level.

The γ curve Lout includes the low-luminance-region input/output characteristic curve LB1 and the high-luminance-region input/output characteristic curve LW1 which are input/output characteristic lines in wider regions (regions of lower luminance and higher luminance relative to the weighed luminance center G1) than the black-side intermediate luminance distribution 61 and the white-side intermediate luminance distribution 62 on the basis of the black-side intermediate luminance distribution 61 and the white-side intermediate luminance distribution 62 which are luminance distributions in local regions, so the low-luminance-region input/output characteristic curve LB1 and the high-luminance-region input/output characteristic curve LW1, and by extension to the γ curve Lout easily form simple curves irrespective of the descriptions of an input image (the YUV signals (Yin, Uin, Vin)). More specifically, in the embodiment, the low-luminance-region input/output characteristic curve LB1 and the high-luminance-region input/output characteristic curve LW1 each include a quadratic curve not having an inflection point, so irrespective of the descriptions of the input image, that is, the histogram distribution of the input luminance signal Yin in each image frame, the γ curve Lout is a simple S-shaped curve.

Figure 14A:
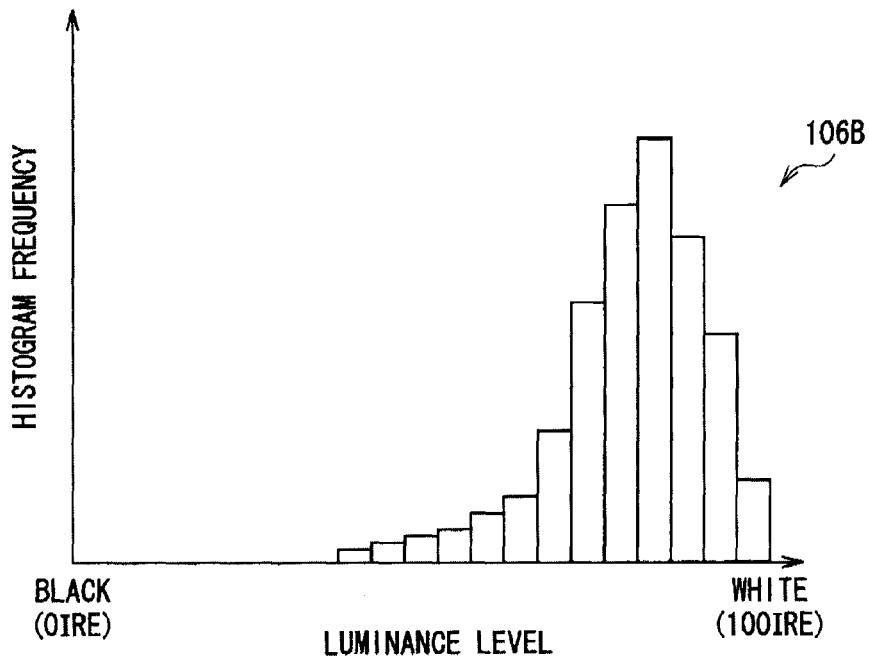
FIGS. 14A and 14B are plots for describing another example of a relationship between a luminance distribution and the change mode of a gamma curve in an image display in a related art.
Figure 14B:
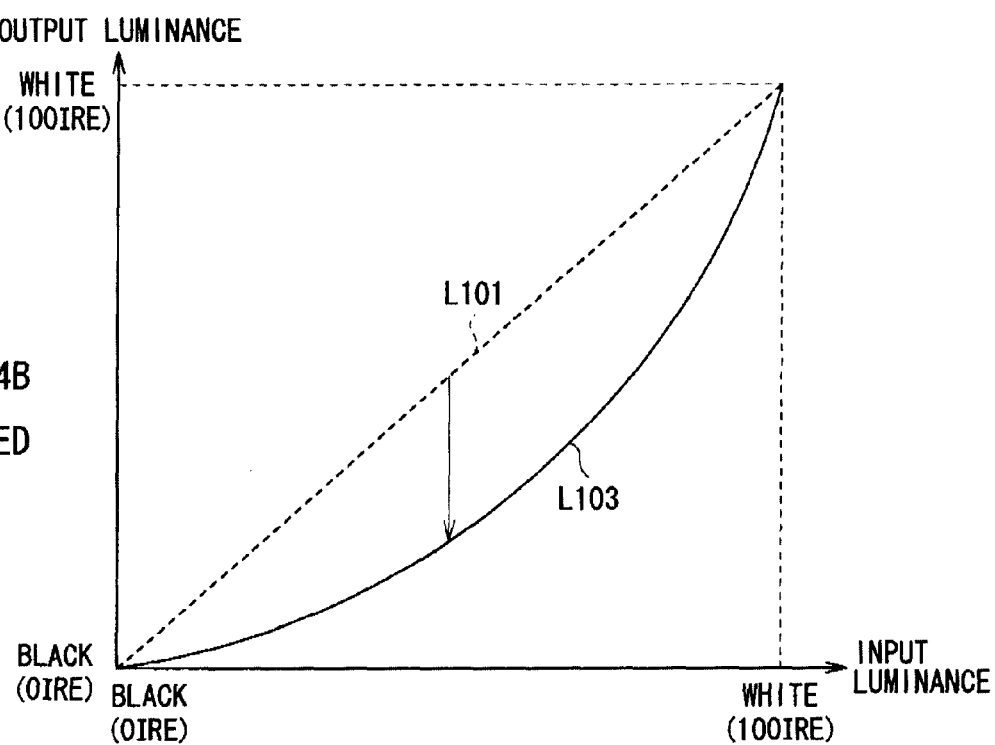
Figure 15A:
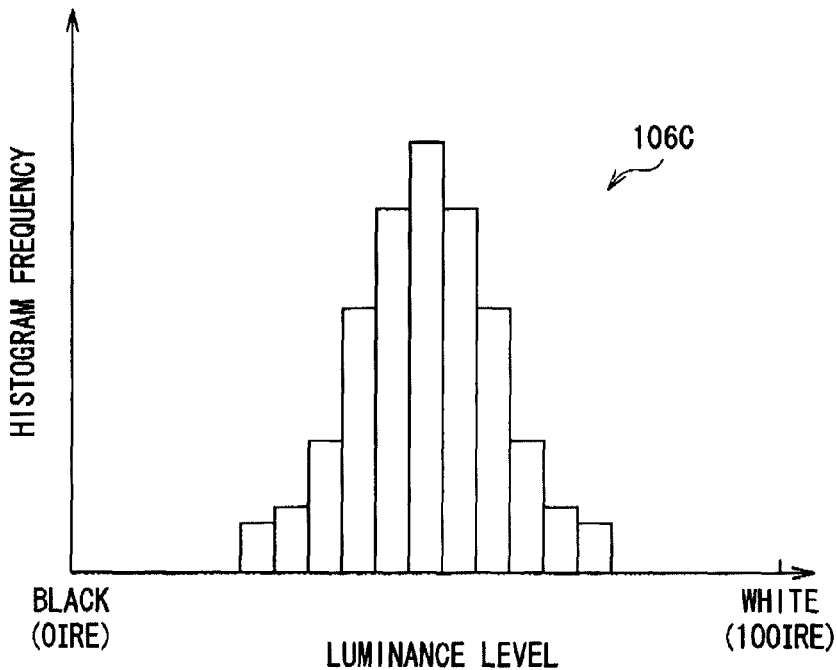
FIGS. 15A and 15B are plots for describing still another example of a relationship between a luminance distribution and the change mode of a gamma curve in an image display in a related art.
Figure 15B:
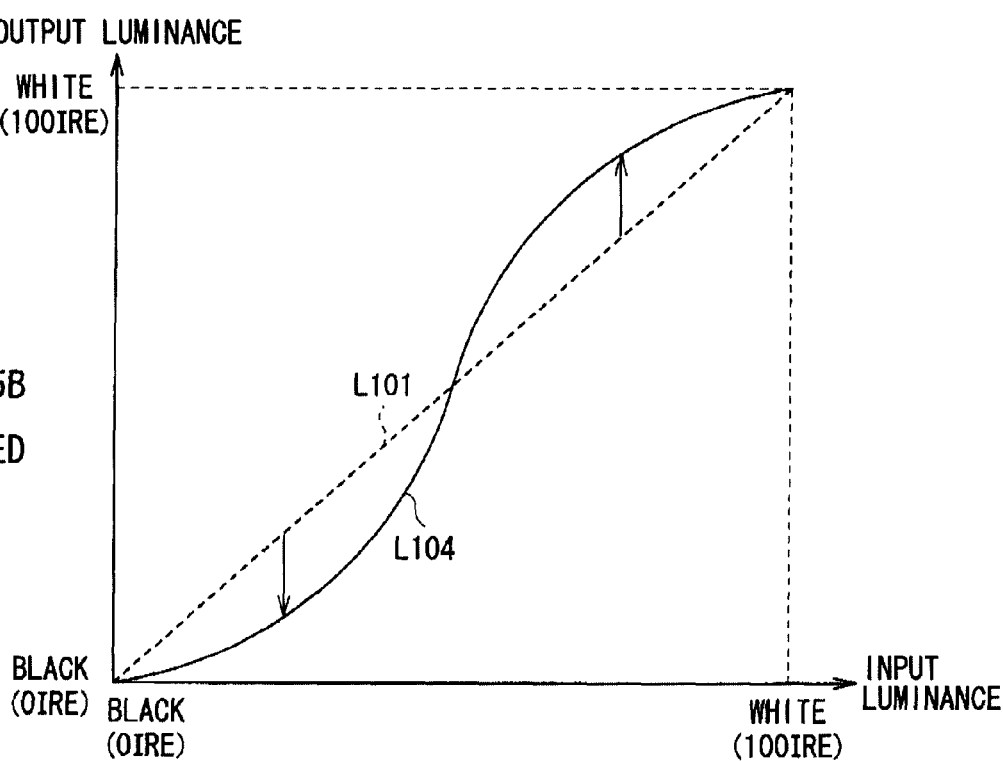
Figure 16A:
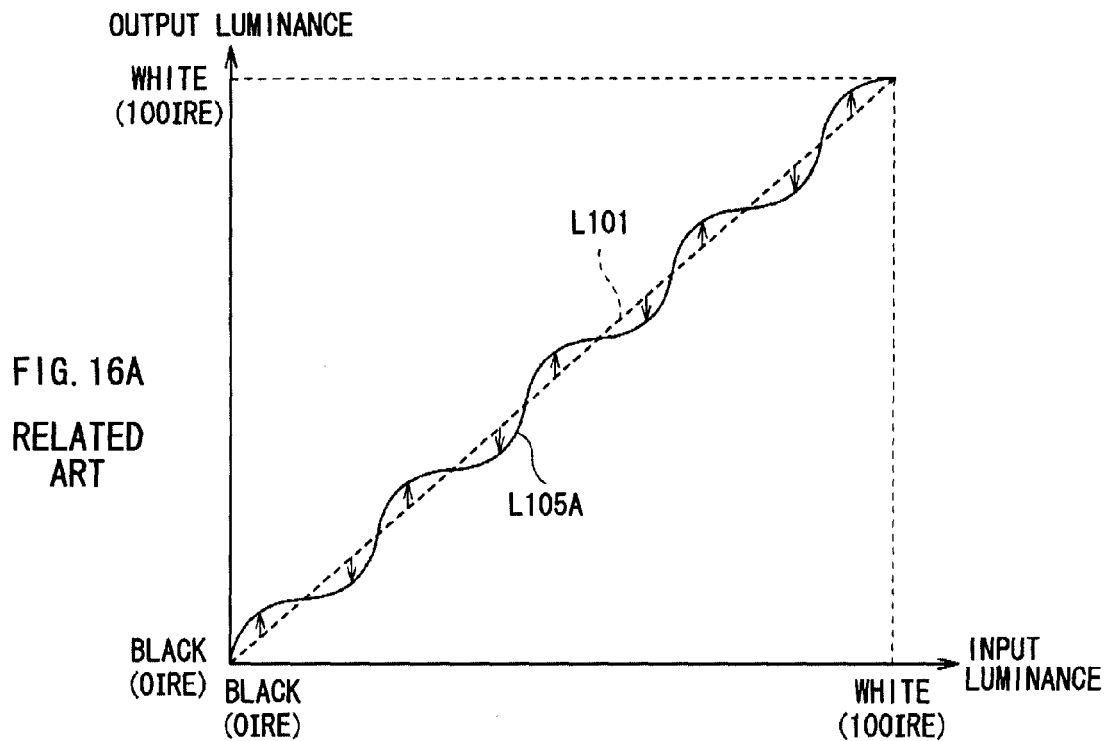
FIGS. 16A and 16B are plots showing another example of the change mode of a gamma curve in an image display in a related art.
Figure 16B:
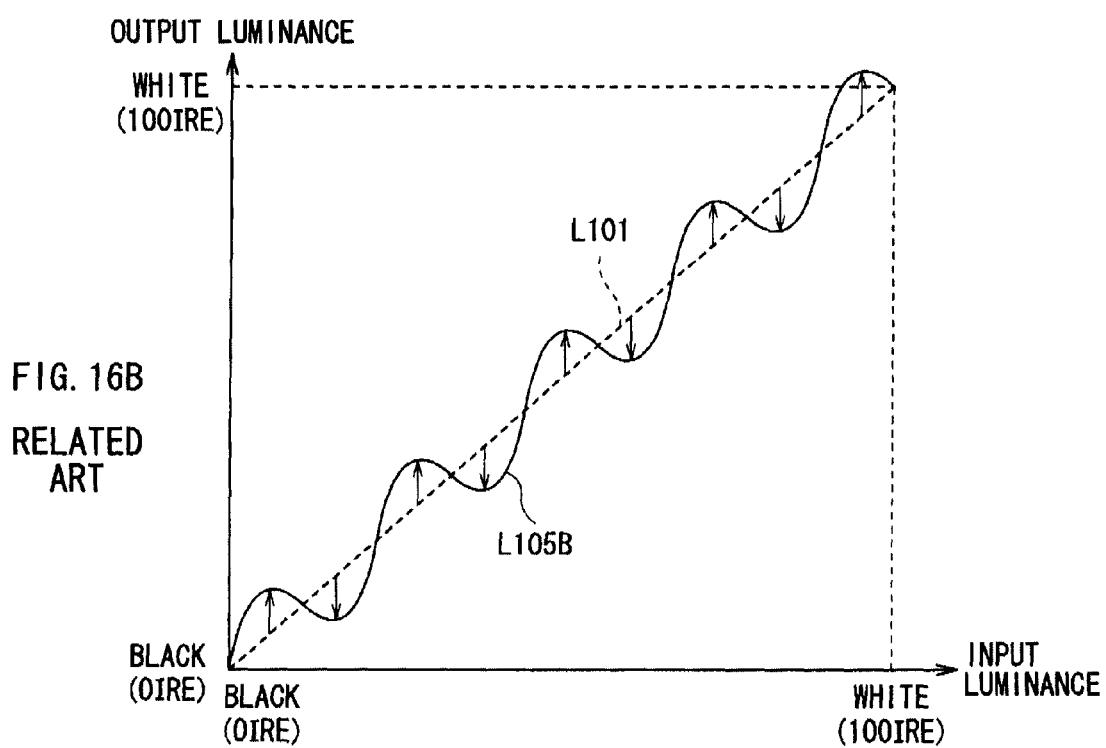

Therefore, for example, in the case of an input image in which a large number of peaks exist in the luminance distribution, in an image display in a related art, as in the case of the gamma curves L105A and L105B shown in FIGS. 14A and 14B, the gamma curve is complicated, so the effect of improving the contrast is reduced (refer to FIG. 14A), or the gamma curve has a negative slope, thereby a displayed image appears unnatural (refer to FIG. 14B). On the other hand, in the image display according to the embodiment, the γ curve Lout easily forms a simple S-shaped curve, so compared to the related art, the contrast of the displayed image is more effectively improved, and the displayed image is prevented from appearing unnatural.

Moreover, as shown in FIGS. 5A and 5B, with respect to the total distribution volumes in the black-side intermediate luminance region 6BM and the white-side intermediate luminance region 6WM, the black-side gain Bg and the white-side gain Wg are increased to the black-side distribution threshold value Bt1 and the white-side distribution threshold value Wt1, respectively, according to the total distribution volumes, so a gain is appropriately set so as to increase the contrast according to the total distribution volumes. Moreover, in the case where the total distribution volume is larger than the black-side distribution threshold value Bt1 or the white-side distribution threshold value Wt1, the values of the black-side gain Bg and the white-side gain Wg are limited so as to prevent a gain in the intermediate luminance region 6M from being excessive. Therefore, for example, even in an enlarged image of a person's skin, the skin contour is not emphasized too much, and a more natural image is displayed. Moreover, in the case where the total distribution volume is larger than the black-side distribution threshold value Bt2 or the white-side distribution threshold value Wt2, the values of the black-side gain Bg and the white-side gain Wg are further limited (to less than the black-side gain threshold value Bg2 and the white-side gain threshold value Wg2, respectively), so even if the total distribution volumes are further increased, a gain in the intermediate luminance region 6M is reliably limited so as not to be excessive.

Next, the matrix circuit 41 reproduces RGB signals (Rout, Gout, Bout) from the YUV signals (Yout, Uout, Vout) after contrast processing, and the driver 42 produces a driving signal on the basis of the RGB signals (Rout, Gout, Bout), and an image is displayed on the display 5 on the basis of the driving signal.

As described above, in the embodiment, in the luminance distribution acquisition circuit 21, the intermediate luminance region 6M is determined in each image frame on the basis of the input luminance signal Yin, and in the black-side intermediate luminance distribution acquisition circuit 22 and the white-side intermediate luminance distribution acquisition circuit 23, the luminance distributions (the black-side intermediate luminance distribution 61 and the white-side intermediate luminance distribution 62) in the intermediate luminance region 6M are acquired in each image frame, and in the characteristic line determining section 24, on the basis of the black-side intermediate luminance distribution 61 and the white-side intermediate luminance distribution 62, a reference input/output characteristic line L0 is adaptively changed, so the γ curve Lout is determined in each image frame, and in the γ correction execution circuit 31, on the basis of the γ curve Lout, image correction on the YUV signals (Yin, Uin, Vin) is executed, so irrespective of the descriptions of input image data, the γ curve Lout can easily form a simple curve. Therefore, for example, even in the case where the luminance histogram distribution in the image frame includes a large number of distribution peaks, the displayed image does not appear unnatural, and effective contrast improvement can be achieved.

More specifically, the black-side intermediate luminance distribution 61 and the white-side intermediate luminance distribution 62 in the intermediate luminance region 6M in the luminance distribution 6 of the luminance signal Yin in each image frame are acquired in each image frame, and in the characteristic line determining section 24, on the basis of the black-side intermediate luminance distribution 61 and the white-side intermediate luminance distribution 62, the low-luminance-region input/output characteristic curve LB1 passing through the reference point (the weighed luminance center G1) and the minimum luminance point P3 and the high-luminance-region input/output characteristic curve LW1 passing through the weighed luminance center G1 and the maximum luminance point P4 are determined in each image frame, and in the γ correction execution circuit 31, on the basis of the determined low-luminance-region input/output characteristic curve LB1 and the determined high-luminance-region input/output characteristic curve LW1, image correction on the YUV signals (Yin, Uin, Vin) in regions of lower luminance and higher luminance relative to the weighed luminance center G1 is performed, so irrespective of the descriptions of input image date, the low-luminance-region input/output characteristic curve LB1 and the high-luminance-region input/output characteristic curve LW1 each can easily form a simple curve.

Moreover, in the case where the total distribution volume of the black-side intermediate luminance region 6BM or the white-side intermediate luminance region 6WM is larger than the black-side distribution threshold value Bt1 or the white-side distribution threshold value Wt1, the values of the black-side gain Bg and the white-side gain Wg are limited, so a gain in the intermediate luminance region 6M can be prevented from being excessive. Therefore, for example, in an enlarged image of a person's skin, the skin contour is not emphasized too much, and a more natural image can be displayed.

Moreover, in the case where the total distribution volume in the black-side intermediate luminance region 6BM or the white-side intermediate luminance region 6WM is larger than the black-side distribution threshold value Bt2 or the white-side distribution threshold value Wt2, the values of the black-side gain Bg and the white-side gain Wg are further limited (to less than the black-side gain threshold value Bg2 and the white-side gain threshold value Wg2, respectively), so even if the total distribution volume is further increased, a gain in the intermediate luminance region 6M can be reliably prevented from being excessive.

Further, the black-side intermediate luminance distribution acquisition circuit 22 and the white-side intermediate luminance distribution acquisition circuit 23 are separately arranged, so the operation of improving the contrast in the low luminance region and the operation of improving the contrast in the high luminance region can be separately performed.

Second Embodiment

Next, a second embodiment of the invention will be described below. An image display according to the embodiment further includes a black-side luminance distribution acquisition circuit 25 and a white-side luminance distribution acquisition circuit 26 in the input-output characteristic line generating section 2 in the image display according to the first embodiment.

Figure 6:
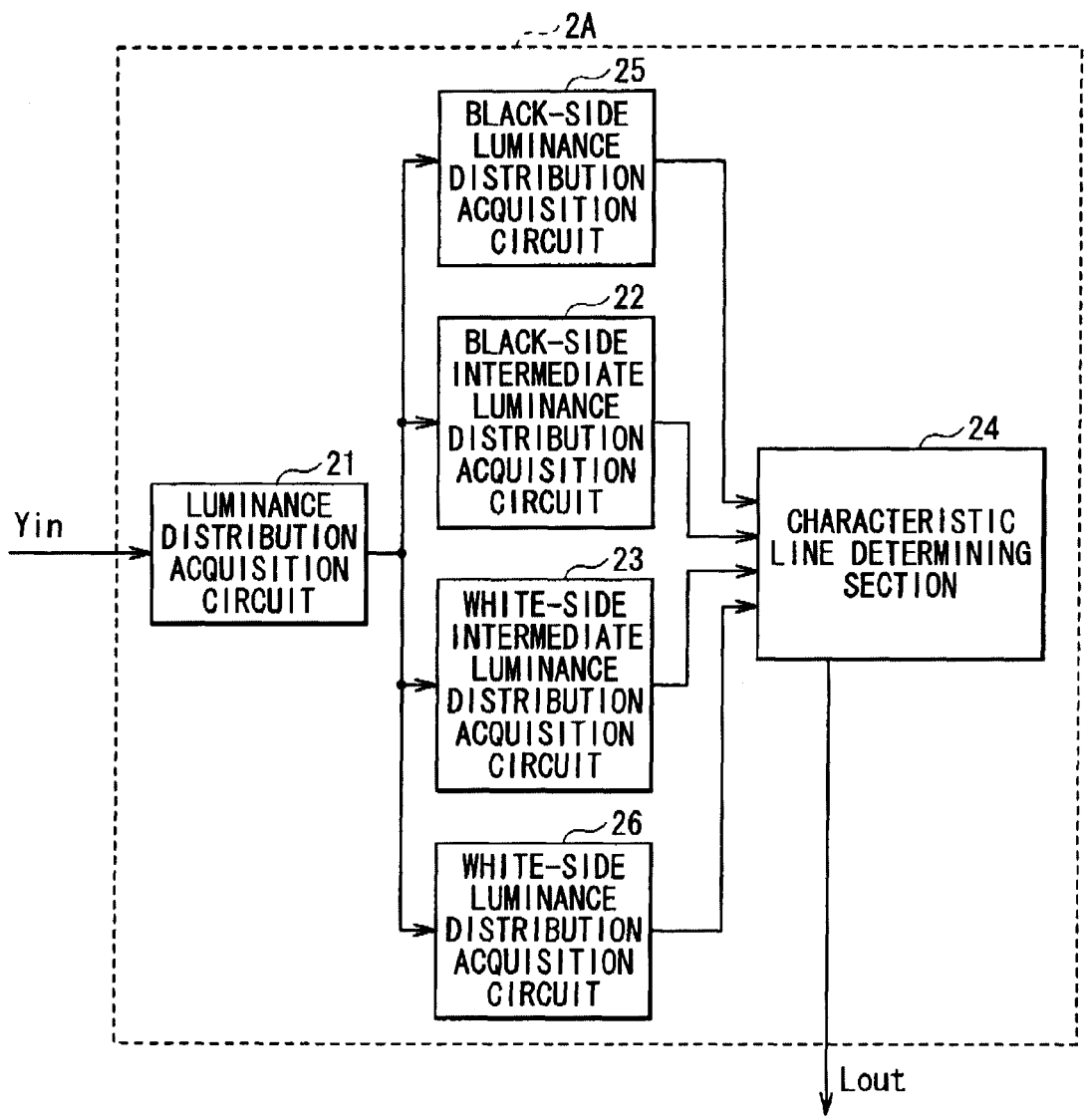
FIG. 6 is a circuit block diagram showing the configuration of input/output characteristic line generating section according to a second embodiment of the invention.

FIG. 6 shows the configuration of an input/output characteristic line generating section 2A according to the embodiment. The input/output characteristic line generating section 2A according to the embodiment includes the luminance distribution acquisition circuit 21, the black-side intermediate luminance distribution acquisition circuit 22, the white-side intermediate luminance distribution acquisition circuit 23, the characteristic line determining section 24, the black-side luminance distribution acquisition circuit 25 and the white-side luminance distribution acquisition circuit 26. Like components are denoted by like numerals as of the first embodiment and will not be further described.

Figure 7A:
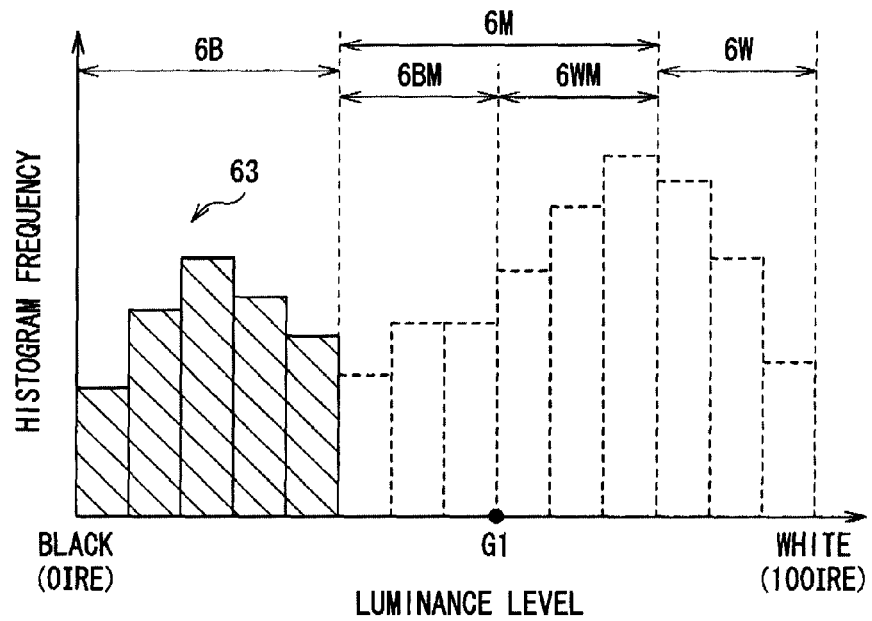
FIGS. 7A and 7B are plots for describing a black-side luminance distribution and a white-side luminance distribution.
Figure 7B:
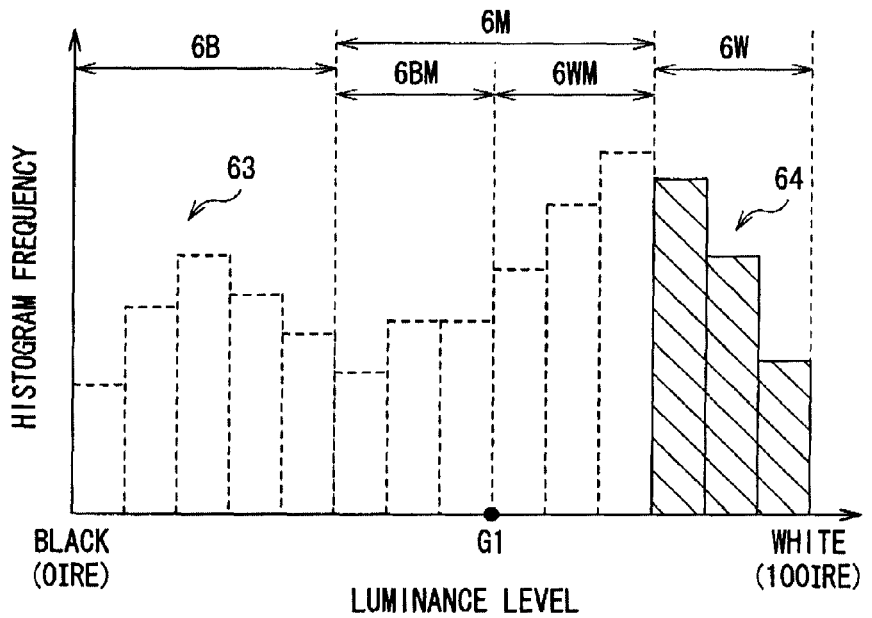

For example, as shown in FIG. 7A, the black-side luminance distribution acquisition circuit 25 acquires a black-side luminance distribution 63 in each image frame as a luminance distribution in a region (a black-side luminance region 6B) on a lower luminance side than the intermediate luminance region 6M determined in each image frame on the basis of data of the luminance distribution 6, the weighed luminance center G and the intermediate luminance region 6M acquired by the luminance distribution acquisition circuit 21. Likewise, for example, as shown in FIG. 7B, the white-side luminance distribution acquisition circuit 26 acquires a white-side luminance distribution 64 in each image frame as a luminance distribution in a region (a white-side luminance region 6W) on a higher luminance side than the intermediate luminance region 6M determined in each image frame on the basis of the data of the luminance distribution 6, the weighed luminance center G and the intermediate luminance region 6M acquired by the luminance distribution acquisition circuit 21.

In this case, the luminance distribution acquisition circuit 21, the black-side intermediate luminance distribution acquisition circuit 22, the white-side intermediate luminance distribution acquisition circuit 23, the black-side luminance distribution acquisition circuit 25 and the white-side luminance distribution acquisition circuit 26 correspond to specific examples of "a luminance distribution acquiring means" in the invention.

In the input/output characteristic line generating section 2A according to the embodiment, the following operation of generating the γ curve Lout is performed on the basis of the inputted luminance signal Yin.

At first, in the luminance distribution acquisition circuit 21, as in the case of the first embodiment, the luminance distribution 6 as a histogram distribution is acquired in each image frame on the basis of the luminance signal Yin, and on the basis of the acquired luminance distribution, the weighed luminance center G1 and the intermediate luminance region 6M are determined in each image frame. Next, in the black-side intermediate luminance distribution acquisition circuit 22 and the white-side intermediate luminance distribution acquisition circuit 23, as in the case of the first embodiment, on the basis of the data of the luminance distribution 6, the weighed luminance center G and the intermediate luminance region 6M, the black-side intermediate luminance distribution 61 and the white-side intermediate luminance distribution 62 are acquired in each image frame. On the other hand, in the black-side luminance distribution acquisition circuit 25 and the white-side luminance distribution acquisition circuit 26, on the basis of the data of the luminance distribution 6, the weighed luminance center G and the intermediate luminance region 6M, the black-side luminance distribution 63 and the white-side luminance distribution 64 are acquired in each image frame.

Next, in the characteristic line determining section 24, as in the case of the first embodiment, on the basis of the black-side intermediate luminance distribution 61 acquired by the black-side intermediate luminance distribution acquisition circuit 22 and the white-side intermediate luminance distribution 62 acquired by the white-side intermediate luminance distribution acquisition circuit 23, the low-luminance-region input/output characteristic curve LB1 and the high-luminance-region input/output characteristic curve LW1 are generated.

Figure 8A:
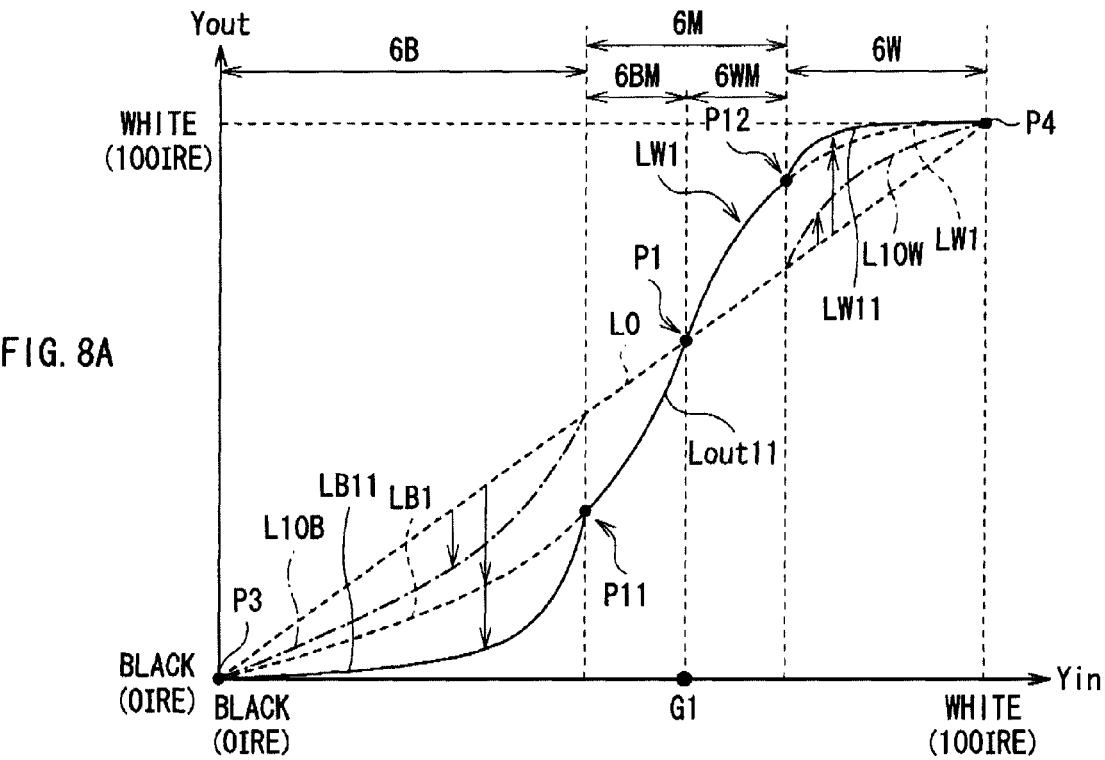
FIGS. 8A and 8B are plots showing specific examples of an input/output characteristic line according to the second embodiment.

In the characteristic line determining section 24 according to the embodiment, when the γ curve Lout is finally determined, the γ curve Lout is determined on the basis of the black-side luminance distribution 63 acquired by the black-side luminance distribution acquisition circuit 25 and the white-side luminance distribution 64 acquired by the white-side luminance distribution acquisition circuit 26 in addition to the low-luminance-region input/output characteristic curve LB1 and the high-luminance-region input/output characteristic curve LW1. More specifically, as in the case of a γ curve Lout11 shown in FIG. 8A, the gain of an input/output characteristic line L10B generated on the basis of the black-side luminance distribution 63 and the gain of an input/output characteristic line L10W generated on the basis of the white-side luminance distribution 64 are superimposed on the gains of the low-luminance-region input/output characteristic curve LB1 and the high-luminance-region input/output characteristic curve LW1 so as to finally determine the γ curve Lout11 including a low-luminance-region input/output characteristic curve LB11 and a high-luminance-region input/output characteristic curve LW11. Therefore, the γ curve Lout11 is determined in consideration of the luminance distributions in the black-side luminance region 6B and the white-side luminance region 6W in addition to the luminance distribution in the intermediate luminance region 6M so as to adjust the γ curve more finely.

Figure 8B:
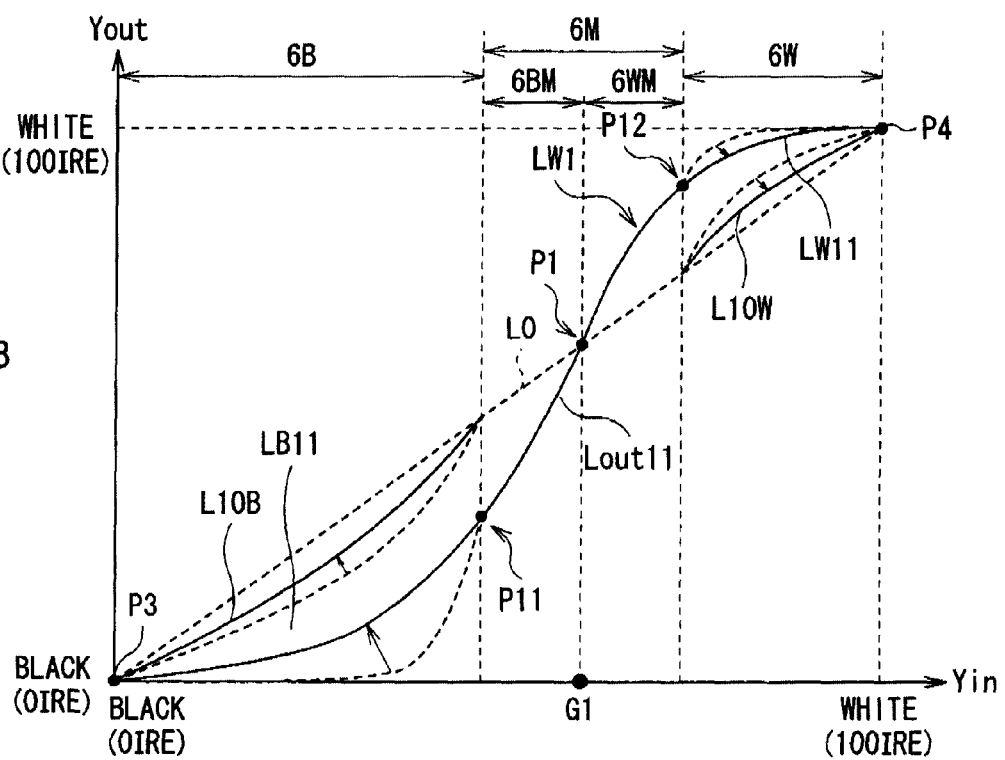

Moreover, for example, as shown in FIG. 8B, in the case where as a result of superimposing the gains of the input/output characteristic line L10B and the input/output characteristic line L10W on the gains of the low-luminance-region input/output characteristic curve LB1 and the high-luminance-region input/output characteristic curve LW1, the gain of the low-luminance-region input/output characteristic curve LB11 or the high-luminance-region input/output characteristic curve LW11 becomes excessive, and in a part of the black-side luminance region 6B or the white-side luminance region 6W, even though an input is changed, an output is not changed, so it is difficult to show gray levels, the gains of the input/output characteristic line L10B and the input/output characteristic line L10W are corrected so as to be smaller, and the gain of the low-luminance-region input/output characteristic curve LB11 or the high-luminance-region input/output characteristic curve LW11 is prevented from being excessive. Therefore, a part of the black-side luminance region 6B or the white-side luminance region 6W can be prevented from being collapsed, and gray levels can be displayed reliably.

Figure 9A:
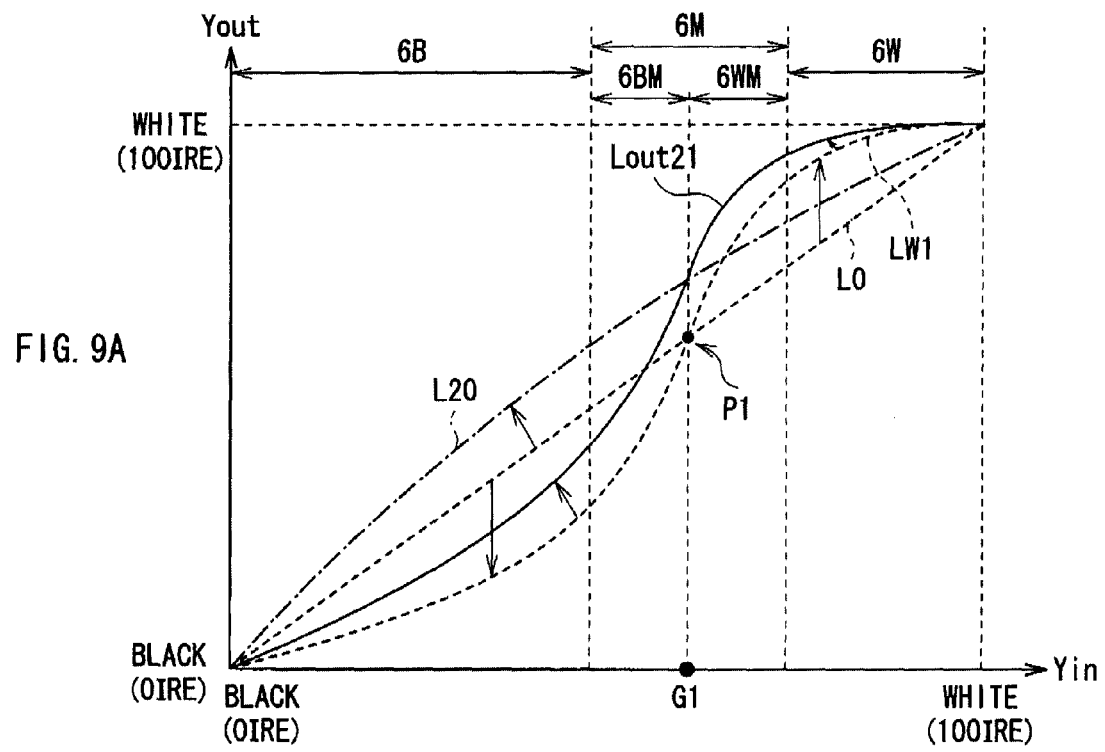
FIGS. 9A and 9B are plots showing other specific examples of the input/output characteristic line according to the second embodiment.
Figure 9B:
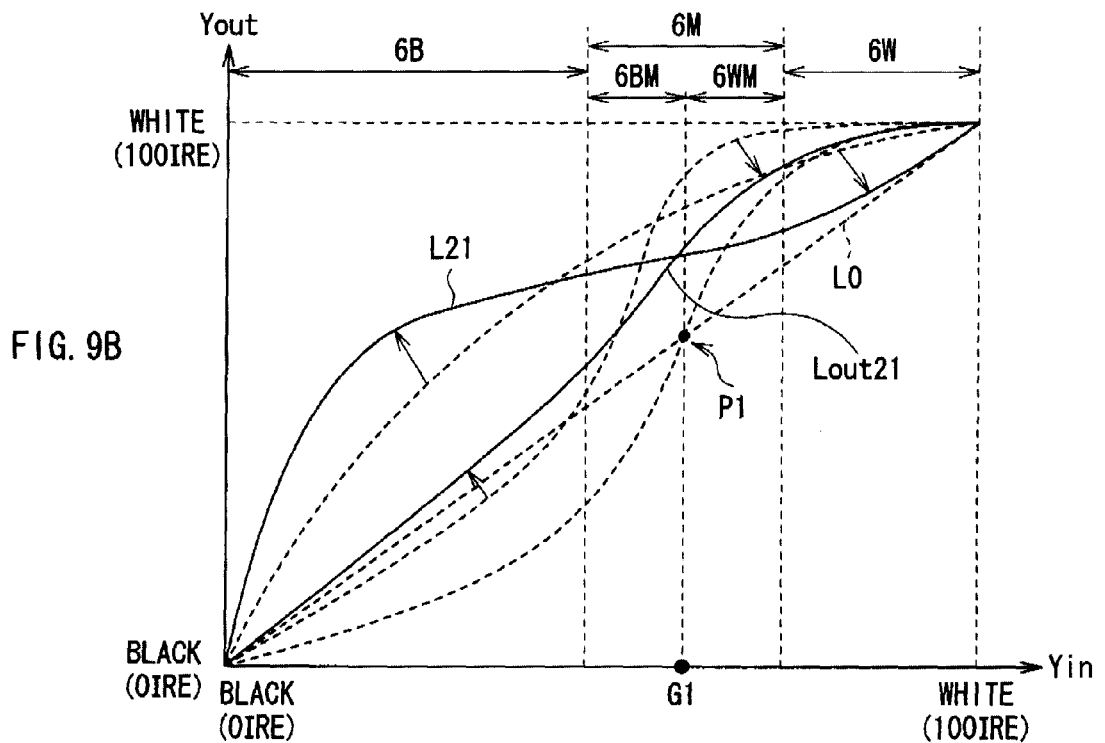

In addition, for example, as shown in FIG. 9A, in the case where an input/output characteristic line generated on the basis of the black-side luminance distribution 63 or the white-side luminance distribution 64 has a shape like an input/output characteristic line L20 in the drawing, the input/output characteristic line is determined like a γ curve Lout21 in the drawing in a like manner, and in the case where the gain at this time becomes excessive, like an input/output characteristic line L21 shown in FIG. 9B, the gain of the γ curve Lout21 is corrected so as not to become excessive.

As described above, in the embodiment, when the γ curve Lout is finally determined, the γ curve Lout is determined in consideration of the black-side luminance distribution 63 acquired by the black-side luminance distribution acquisition circuit 25 and the white-side luminance distribution 64 acquired by the white-side luminance distribution acquisition circuit 26 in addition to the low-luminance-region input/output characteristic curve LB1 and the high-luminance-region input/output characteristic curve LW1, so when the γ curve Lout11 is determined also in consideration of the luminance distributions in the black-side luminance region 6B and the white-side luminance region 6W, the γ curve can be adjusted more finely.

More specifically, for example, in the case where as a result of superimposing the gains of the input/output characteristic line L10B and the input/output characteristic line L10W, the gain of the low-luminance-region input/output characteristic curve LB11 or the high-luminance-region input/output characteristic curve LW11 becomes excessive, and it is difficult to display gray levels in a part of the black-side luminance region 6B or the white-side luminance region 6W, the gains of the input/output characteristic line L10B and the input/output characteristic line L10W are corrected so as to be smaller, so a part of the black-side luminance region 6B or the white-side luminance region 6W can be prevented from being collapsed, and gray levels can be displayed reliably.

Moreover, the black-side luminance distribution acquisition circuit 25 and the white-side luminance distribution acquisition circuit 26 are separately arranged, so in the embodiment, the operation of improving the contrast in the low luminance region and the operation of improving the contrast in the high luminance region can be separately performed.

Although the present invention is described referring to the first embodiment and the second embodiment, the invention is not limited to them, and can be variously modified.

Figure 10A:
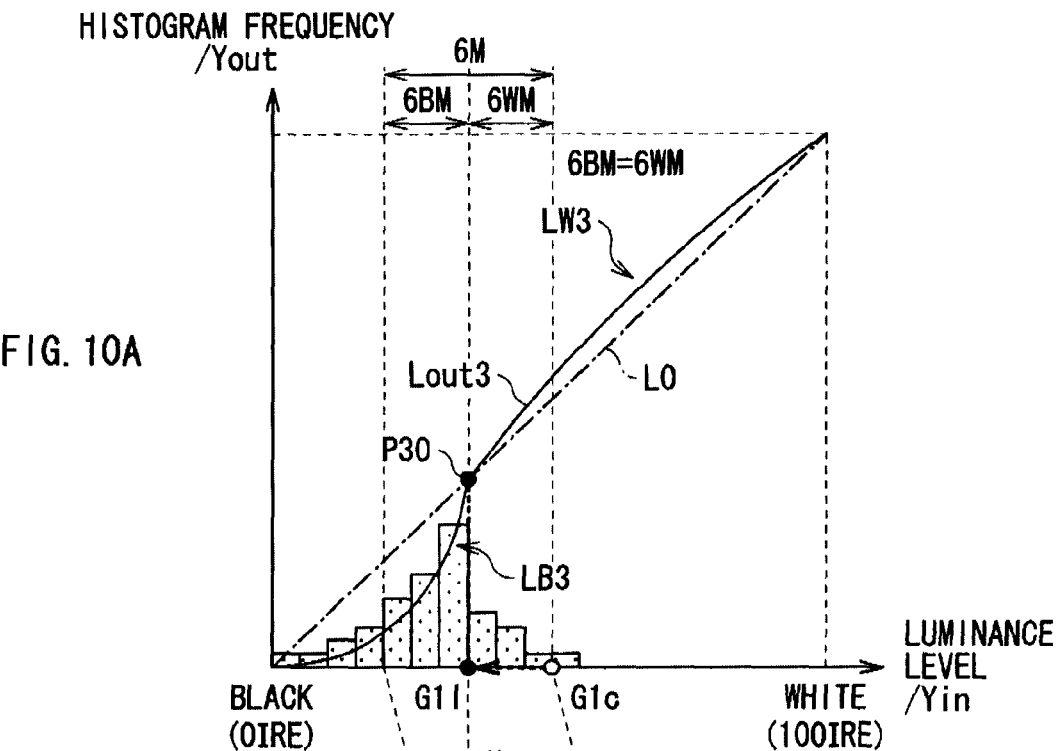
FIGS. 10A and 10B are plots for describing a relationship between a luminance distribution, a reference luminance, and an intermediate luminance region according to a modification of the invention.
Figure 11A:
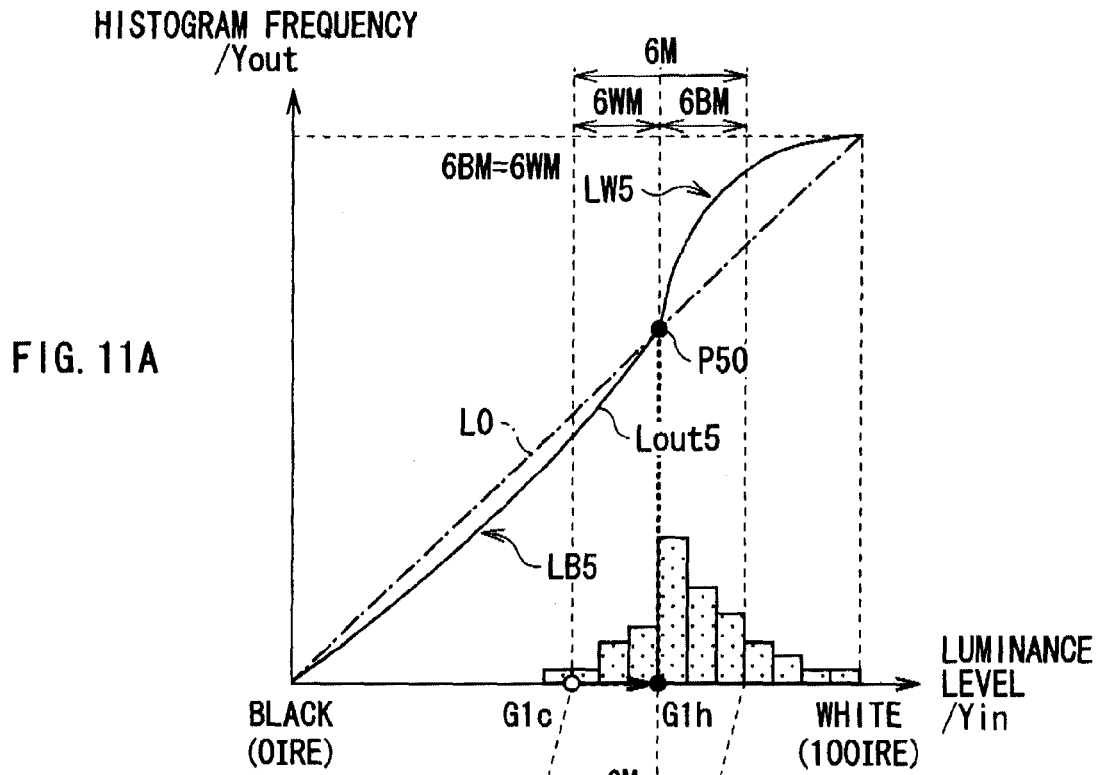
FIGS. 11A and 11B are plots for describing a relationship between a luminance distribution, a reference luminance, and an intermediate luminance region according to a modification of the invention.

For example, in the above-described embodiment, in the case where the weighed luminance center G1 is determined on the basis of the luminance distribution 6 in the whole luminance region as shown in FIG. 2, and the intermediate luminance region is determined on the basis of the weighed luminance center G1, an area having a predetermined width (in the example shown in FIG. 2, a width equal to 3 gray levels) from the weighed intermediate luminance center to each of a low luminance side as a black side and a high luminance side as a white side is determined as the as the intermediate luminance region 6M in each image frame. However, in the case where the weighed luminance center G1 is biased to a black side as shown in FIG. 10A (in the case where a weighed luminance center G1l is provided on a lower luminance side than a weighed luminance center G1c), an input/output characteristic line Lout3 including a low-luminance-region input/output characteristic curve LB3 both passing through a center point P30 and a high-luminance-region input/output characteristic curve LW3 is determined by the characteristic line determining section 24; however, by the low-luminance-region input/output characteristic curve LB3, as shown in the drawing, a black gain is excessively reduced, so it is difficult to reproduce details of black, thereby an image appears too dark. Moreover, in the case where the weighed luminance center G1 is biased to a white side as shown in FIG. 11A (in the case where a weighed luminance center G1h is provided on a higher luminance side than the weighed lumimance center G1c), an input/output characteristic line Lout5 including a low-luminance-region input/output characteristic curve LB5 both passing through a center point P50 and a high-luminance-region input/output characteristic curve LW5 is determined by the characteristic line determining section 24; however, by the high-luminance-region input/output characteristic curve LB5, as shown in the drawing, a white gain is excessively increased, so as a result, an image appears too bright.

Figure 10B:
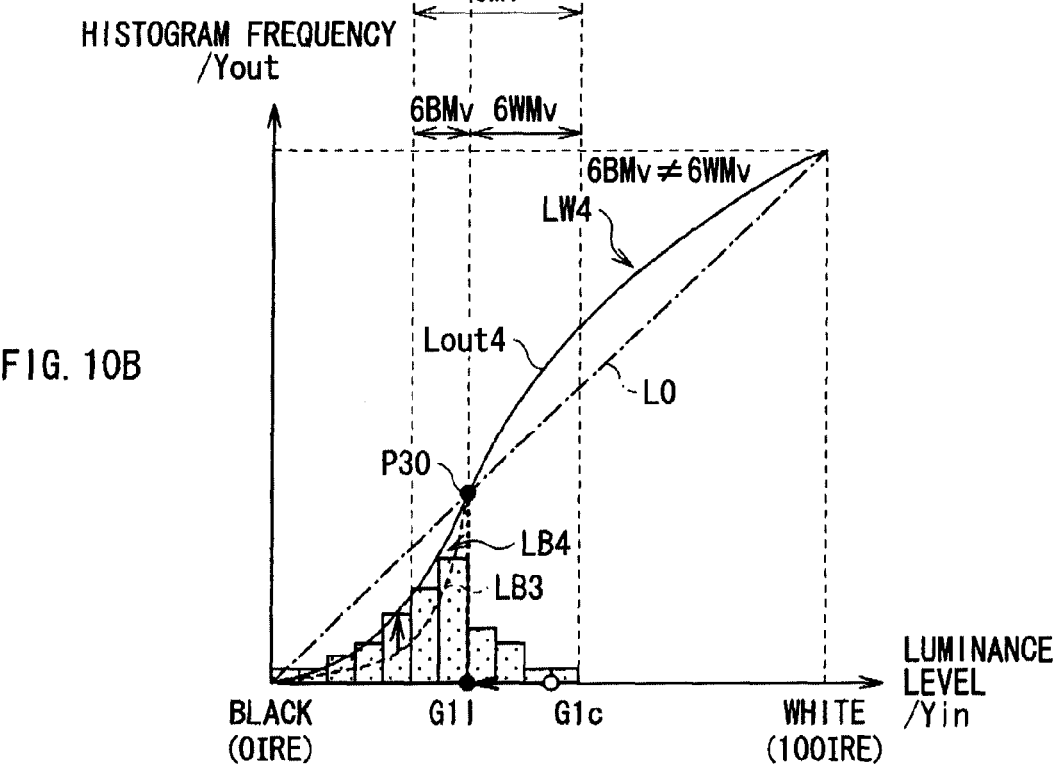
Figure 11B:
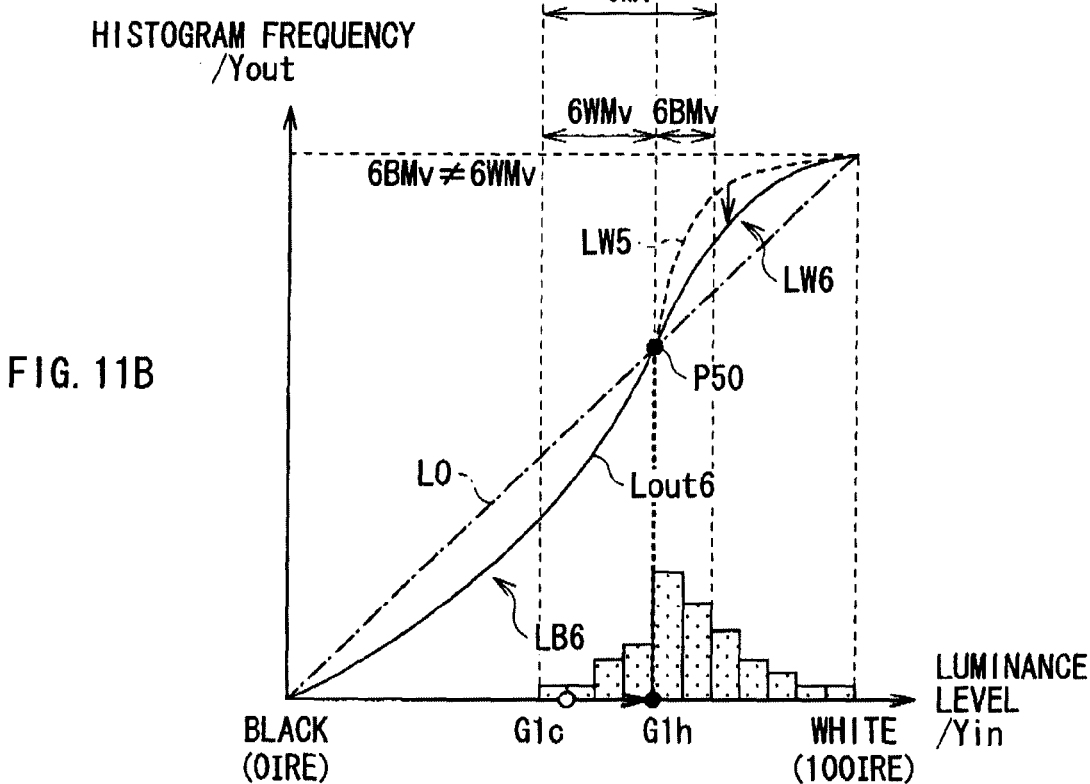

Thus, in the case where the weighed luminance center G1 is biased to a black side or a white side, as shown in FIG. 10B or FIG. 11B, an area in which the width is the same as that of the intermediate luminance region 6M, and a width from the weighed intermediate luminance center on a side where the weighed luminance center G1 is biased is narrower and a width on the other side is wider is determined as an intermediate region 6Mv, so the black gain or the white gain can be prevented from becoming excessive, thereby more effective contract improvement can be achieved.

Figure 12:
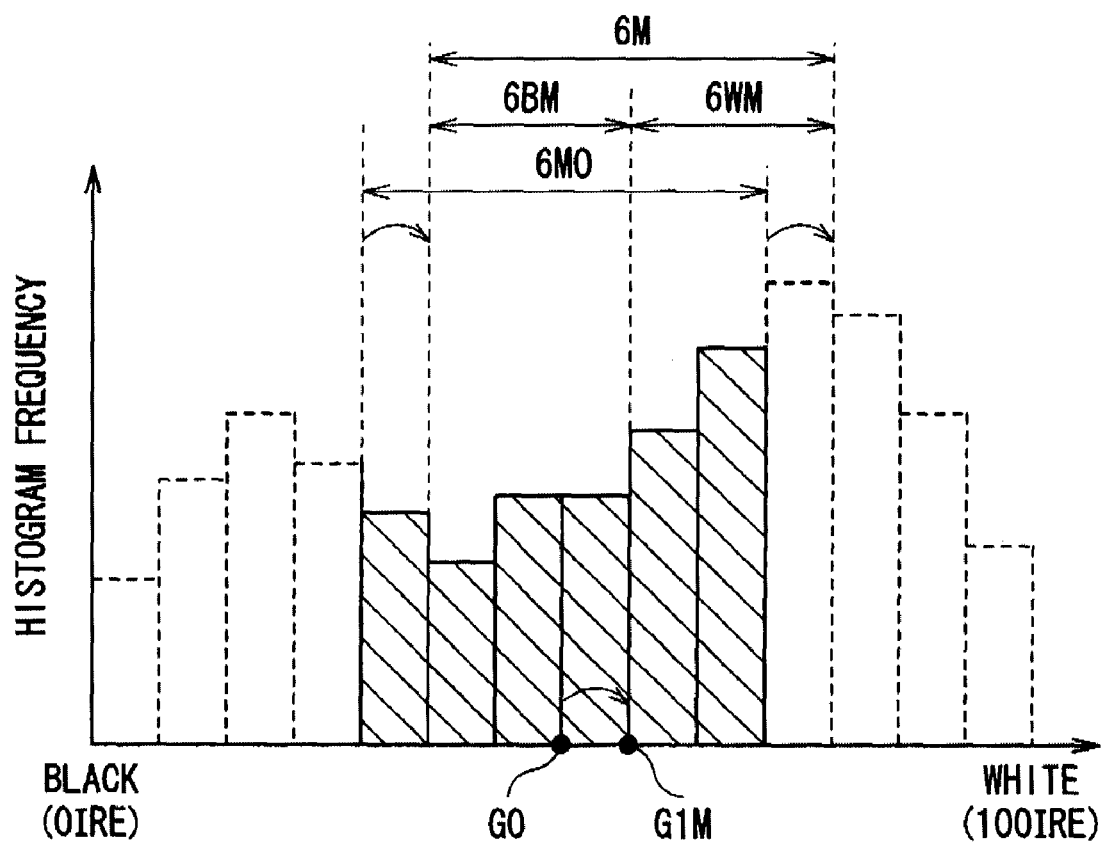
FIG. 12 is a plot for describing a relationship between a luminance distribution, an initial reference luminance, an initial intermediate luminance region and a weighed intermediate luminance center according to a modification of the invention.
Figure 13A:
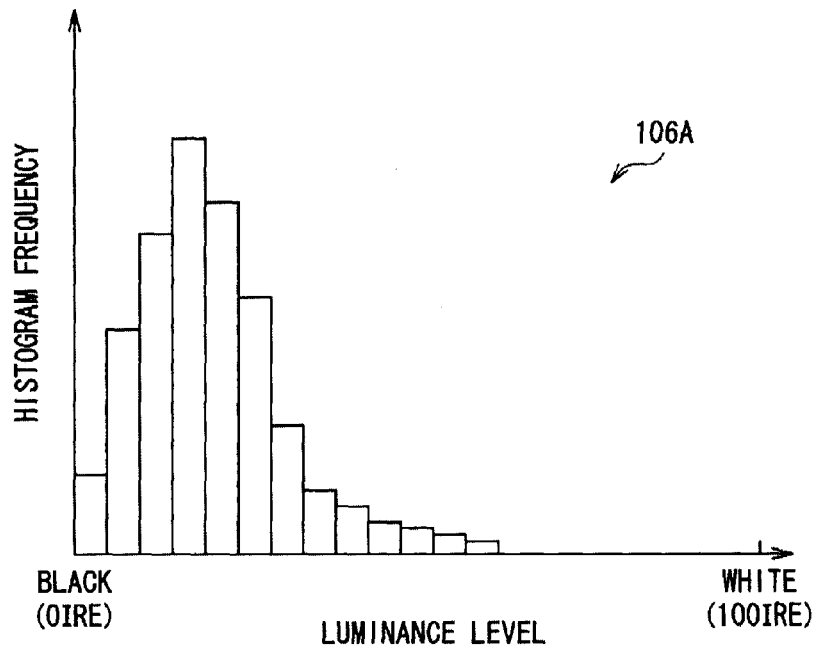
FIGS. 13A and 13B are plots for describing an example of a relationship between a luminance distribution and the change mode of a gamma curve in an image display in a related art.
Figure 13B:
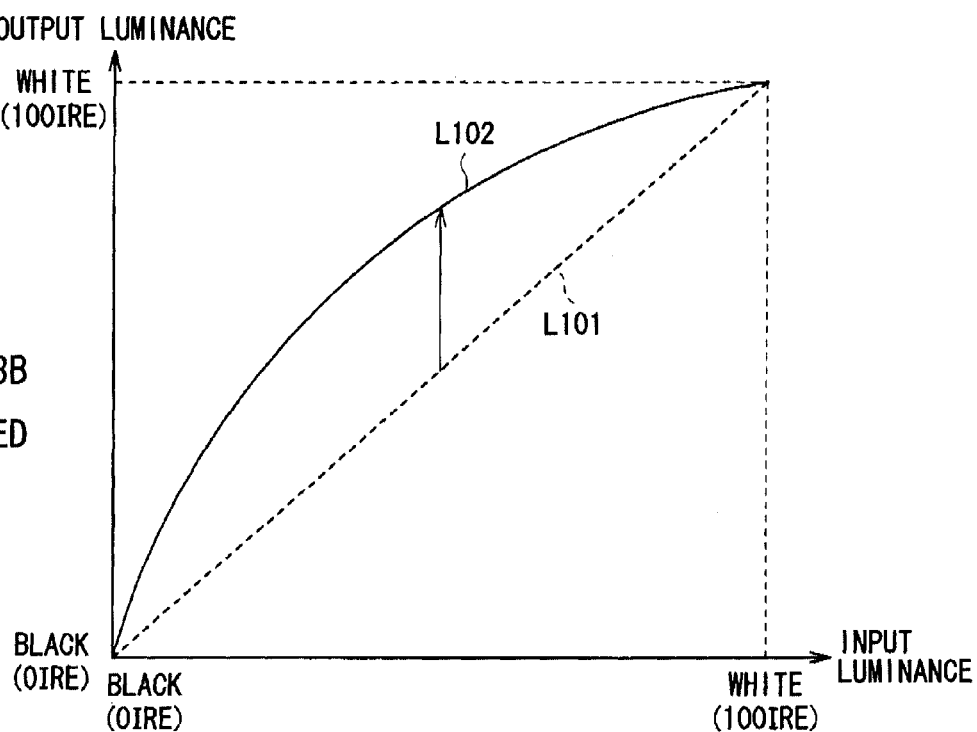

For example, in the above-described embodiments, the case where the weighed luminance center G1 is determined on the basis of the luminance distribution 6 in the whole luminance region as shown in FIG. 2, and the intermediate luminance region 6M is determined on the basis of the weighed luminance center G1 is described; however, for example, as shown in FIG. 12, a weighed luminance center (a weighed intermediate luminance center G1M) is determined on the basis of a luminance distribution in a predetermined initial intermediate luminance region 6M0, and an area having a predetermined width (in the example shown in FIG. 12, a width equal to 3 gray levels) from the weighed intermediate luminance center G1M to each of a low luminance side and a high luminance side may be determined as an intermediate luminance region 6M in each image frame. In such a configuration, the same effects as those in the above-described embodiments can be obtained.

Moreover, in the above-described embodiments, the relationship between the total distribution volume in the black-side intermediate luminance region 6BM or the white-side intermediate luminance region 6WM and the black-side gain Bg or the white-side gain Wg is described in detail referring to FIGS. 5A and 5B; however, the invention is not limited to this case. For example, in the regions B2 and W2 and the region B4 and W4, the black-side gain Bg and the white-side gain Wg may not have a uniform value, and may be slightly increased or decreased to a degree to which the gains do not become excessive. Further, the black-side gain Bg and the white-side gain Wg may be increased from the regions B0 and W0, or gains may be decreased directly from the region B2 and W2 to the regions B4 and W4 without arranging the regions B3 and W3.

In the above-described embodiments, the case where the black-side intermediate luminance distribution acquisition circuit 22 and the white-side intermediate luminance distribution acquisition circuit 23 are arranged in the input/output characteristic line generating section 2, or in addition to them, the black-side luminance distribution acquisition circuit 25 and the white-side luminance distribution acquisition circuit 26 are arranged in the input/output characteristic line generating section 2A so as to concurrently perform the contrast improvement process on a low luminance side and the contrast improvement process on a high luminance side is described; however, only either of the black-side intermediate luminance distribution acquisition circuit 22 and the white-side intermediate luminance distribution acquisition circuit 23 may be arranged, or in addition to this, only either of the black-side luminance distribution acquisition circuit 25 and the white-side luminance distribution acquisition circuit 26 may be arranged so as to perform the contrast improvement process on either of the low luminance side and the high luminance side. Even in such a configuration, a more natural image than that in a related art can be displayed, and the contrast can be effectively improved.

In the above-described embodiments, the case where the image processing section 3 includes the γ correction execution circuit 31 is described; however, the configuration of the image processing section 3 is not limited to this case, and the image processing section 3 may include, for example, another circuit for image processing, or a plurality of such circuits.

It should be understood by those skilled in the art that various modifications, combinations, sub-combinations and alterations may occur depending on design requirements and other factors insofar as they are within the scope of the appended claims or the equivalents thereof.

What is claimed is:

1. An image correction circuit comprising:
    a region determining means for determining
        an intermediate luminance region in each image frame on the basis of descriptions of input image data by calculating a weighed luminance center of a luminance distribution of the input image data in each entire image frame, the weighed luminance center being a luminance position corresponding to a sum of a product of luminance and frequency divided by a sum of frequency in the luminance distribution, the intermediate luminance region including a black-intermediate region and a white-intermediate region, a size of the black-intermediate region being different from a size of the white-intermediate region in response to whether the weighted luminance center is biased to a low luminance side or a high luminance side, and
        a black-side luminance region and a white-side luminance region based on the luminance distribution, the weighted luminance center, and the intermediate luminance region, the black-side luminance region being a region of luminance that is lower than the lowest luminance in the intermediate luminance region, the white-side luminance region being a region of luminance that is higher than the highest luminance in the intermediate luminance region, and the intermediate luminance region, the black-side luminance region, and the white-side luminance region being different and non-overlapping;

a luminance distribution acquiring means for acquiring the luminance distribution of the input image data in the determined intermediate luminance region in each image frame;

a determining means for determining an input/output characteristic line in each image frame by adaptively changing a predetermined reference input/output characteristic line on the basis of the acquired luminance distribution of the intermediate luminance region, the input/output characteristic line defining the substance of image correction on the input image data; and a correction executing means for executing image correction on the input image data on the basis of the determined input/output characteristic line.

2. The image correction circuit according to claim 1, wherein
the region determining means determines an area as the intermediate luminance region, the area determined by setting a first width from the acquired weighed luminance center to the low luminance side by setting a second width from the weighed luminance center to the high luminance side.

3. The image correction circuit according to claim 1, wherein
the luminance distribution acquiring means acquires a black-side intermediate luminance distribution in each image frame as a luminance distribution in a region between a lowest luminance in the determined intermediate luminance region and a reference luminance provided in the center of the intermediate luminance region,
the determining means determines a low-luminance-region input/output characteristic curve on the basis of the acquired black-side intermediate luminance distribution, the low-luminance-region input/output characteristic curve passing through a reference point, in the reference input/output characteristic line, determined in accordance with the reference luminance and through a minimum luminance point of the reference input/output characteristic line, and
the correction executing means executes image correction on input image data having a luminance side which is lower than the reference luminance on the basis of the determined low-luminance-region input/output characteristic curve.

4. The image correction circuit according to claim 3, wherein
the low-luminance-region input/output characteristic curve is a curve provided below the reference input/output characteristic line and not having an inflection point.

5. The image correction circuit according to claim 3, wherein
the luminance distribution acquiring means further acquires a black-side luminance distribution as a luminance distribution in the black-side luminance region, and
the determining means determines the low-luminance-region input/output characteristic curve on the basis of the acquired black-side luminance distribution as well as the black-side intermediate luminance distribution.

6. The image correction circuit according to claim 3, wherein the luminance distribution acquiring means further acquires a white-side intermediate luminance distribution as a luminance distribution in a region between a highest luminance in the determined intermediate luminance region and the reference luminance, the determining means further determines a high-luminance-region input/output characteristic curve passing through the reference point in the reference input/output characteristic line, and through a maximum luminance point of the reference input/output characteristic line on the basis of the acquired white-side intermediate luminance distribution, and the correction executing means executes image correction on input image data in regions of lower luminance and higher luminance relative to the reference luminance on the basis of the determined low-luminance-region input/output characteristic curve and the determined high-luminance-region input/output characteristic curve, respectively.

7. The image correction circuit according to claim 6, wherein
the high-luminance-region input/output characteristic curve is a curve provided above the reference input/output characteristic line and not having an inflection point.

8. The image correction circuit according to claim 6, wherein
the luminance distribution acquiring means further acquires a white-side luminance distribution as a luminance distribution in the white-side luminance region, and
the determining means determines the high-luminance-region input/output characteristic curve on the basis of the acquired white-side luminance distribution as well as the white-side intermediate luminance distribution.

9. The image correction circuit according to claim 1, wherein
the luminance distribution acquiring means acquires a white-side intermediate luminance distribution in each image frame as a luminance distribution in a region between a highest luminance in the determined intermediate luminance region and a reference luminance provided in the center of the intermediate luminance region,
the determining means determines a high-luminance-region input/output characteristic curve on the basis of the acquired white-side intermediate luminance distribution, the high-luminance-region input/output characteristic line passing through a reference point, in the reference input/output characteristic line, determined in accordance with the reference luminance and through a maximum luminance point of the reference input/output characteristic line, and
the correction executing means executes image correction on input image data having a luminance which is higher than the reference luminance on the basis of the determined high-luminance-region input/output characteristic curve.

10. An image correction method being performed using an image correction device having a processor, the method comprising the steps of:
determining an intermediate luminance region in each image frame on the basis of descriptions of input image data by calculating a weighed luminance center of a luminance distribution of the input image data in each entire image frame, the weighed luminance center being a luminance position corresponding to a sum of a product of luminance and frequency divided by a sum of frequency in the luminance distribution the intermediate luminance region including a black-intermediate region and a white-intermediate region, a size of the black-intermediate region being different from a size of the white-intermediate region in response to whether the weighted luminance center is biased to a low luminance side or a high luminance side;

determining a black-side luminance region and a white-side luminance region based on the luminance distribution, the weighted luminance center, and the intermediate luminance region, the black-side luminance region being a region of luminance that is lower than the lowest luminance in the intermediate luminance region, the white-side luminance region being a region of luminance that is higher than the highest luminance in the intermediate luminance region, and the intermediate luminance region, the black-side luminance region, and the white-side luminance region being different and non-overlapping;

acquiring the luminance distribution of the input image data in the determined intermediate luminance region in each image frame;

determining, using the processor, an input/output characteristic line in each image frame by adaptively changing a predetermined reference input/output characteristic line on the basis of the acquired luminance distribution of the intermediate luminance region, the input/output characteristic line defining the substance of image correction on the input image data; and executing image correction on the input image data on the basis of the determined input/output characteristic line.

11. An image display comprising:

a region determining means for determining
  an intermediate luminance region in each image frame on the basis of descriptions of input image data by calculating a weighed luminance center of a luminance distribution of the input image data in each entire image frame, the weighed luminance center being a luminance position corresponding to a sum of a product of luminance and frequency divided by a sum of frequency in the luminance distribution, the intermediate luminance region including a black-intermediate region and a white-intermediate region, a size of the black-intermediate region being different from a size of the white-intermediate region in response to whether the weighted luminance center is biased to a low luminance side or a high luminance side, and
  a black-side luminance region and a white-side luminance region based on the luminance distribution, the weighted luminance center, and the intermediate luminance region, the black-side luminance region being a region of luminance that is lower than the lowest luminance in the intermediate luminance region, the white-side luminance region being a region of luminance that is higher than the highest luminance in the intermediate luminance region, and the intermediate luminance region, the black-side luminance region, and the white-side luminance region being different and non-overlapping;

a luminance distribution acquiring means for acquiring the luminance distribution of the input image data in the determined intermediate luminance region in each image frame;

a determining means for determining an input/output characteristic line in each image frame by adaptively changing a predetermined reference input/output characteristic line on the basis of the acquired luminance distribution of the intermediate luminance region, the input/output characteristic line defining the substance of image correction on input image data;

a correction executing means for executing image correction on the input image data on the basis of the determined input/output characteristic line, and a display means for displaying an image on the basis of the input image data on which image correction is performed.

12. An image correction circuit comprising:

a region determining section determining
  an intermediate luminance region in each image frame on the basis of descriptions of input image data by calculating a weighed luminance center of a luminance distribution of the input image data in each entire image frame, the weighed luminance center being a luminance position corresponding to a sum of a product of luminance and frequency divided by a sum of frequency in the luminance distribution, the intermediate luminance region including a black-intermediate region and a white-intermediate region, a size of the black-intermediate region being different from a size of the white-intermediate region in response to whether the weighted luminance center is biased to a low luminance side or a high luminance side, and
  a black-side luminance region and a white-side luminance region based on the luminance distribution, the weighted luminance center, and the intermediate luminance region, the black-side luminance region being a region of luminance that is lower than the lowest luminance in the intermediate luminance region, the white-side luminance region being a region of luminance that is higher than the highest luminance in the intermediate luminance region, and the intermediate luminance region, the black-side luminance region, and the white-side luminance region being different and non-overlapping;

a luminance distribution acquiring section acquiring the luminance distribution of the input image data in the determined intermediate luminance region in each image frame;

a determining section determining an input/output characteristic line in each image frame by adaptively changing a predetermined reference input/output characteristic line on the basis of the acquired luminance distribution of the intermediate luminance region, the input/output characteristic line defining the substance of image correction on the input image data; and a correction executing section executing image correction on the input image data on the basis of the determined input/output characteristic line.

13. An image display comprising:

a region determining section determining
  an intermediate luminance region in each image frame on the basis of descriptions of input image data by calculating a weighed luminance center of a luminance distribution of the input image data in each entire image frame, the weighed luminance center being a luminance position corresponding to a sum of a product of luminance and frequency divided by a sum of frequency in the luminance distribution, the intermediate luminance region including a black-intermediate region and a white-intermediate region, a size of the black-intermediate region being different from a size of the white-intermediate region in response to whether the weighted luminance center is biased to a low luminance side or a high luminance side, and a black-side luminance region and a white-side luminance region based on the luminance distribution, the weighted luminance center, and the intermediate luminance region, the black-side luminance region being a region of luminance that is lower than the lowest luminance in the intermediate luminance region, the white-side luminance region being a region of luminance that is higher than the highest luminance in the intermediate luminance region, and the intermediate luminance region, the black-side luminance region, and the white-side luminance region being different and non-overlapping;

a luminance distribution acquiring section acquiring the luminance distribution of the input image data in the determined intermediate luminance region in each image frame;

a determining section determining an input/output characteristic line in each image frame by adaptively changing a predetermined reference input/output characteristic line on the basis of the acquired luminance distribution of the intermediate luminance region, the input/output characteristic line defining the substance of image correction on the input image data;

a correction executing section executing image correction on the input image data on the basis of the determined input/output characteristic line; and a display section displaying an image on the basis of the input image data on which image correction is performed.

14. The image correction circuit according to claim 1, wherein the determining means adaptively changes the predetermined reference input/output characteristic line by adjusting a gain based on a plurality of threshold values such that in a case where the luminance distribution is larger than a first threshold value of the plurality of threshold values, the gain is limited to a substantially uniform value.

15. The image correction circuit according to claim 1, wherein the weighted luminance center is calculated for the luminance distribution which includes all peaks of the input image data in each entire image frame, and the peaks correspond to a background and a foreground in each entire image frame.

16. The image correction circuit according to claim 1, wherein a size of the black-side luminance region is different from a size of the white-side luminance region.

17. The image correction circuit according to claim 2, wherein the first width is equal to three gray levels.

* * * * *